(12) United States Patent
Li et al.

(10) Patent No.: US 12,058,671 B2
(45) Date of Patent: Aug. 6, 2024

(54) COMMUNICATION METHOD AND COMMUNICATIONS APPARATUS

(71) Applicant: Huawei Technologies Co., Ltd., Shenzhen (CN)

(72) Inventors: Chao Li, Beijing (CN); Yuan Wang, Shenzhen (CN); Fuqiang Zhang, Beijing (CN); Xingwei Zhang, Lund (SE); Lei Lu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 15 days.

(21) Appl. No.: 17/487,921

(22) Filed: Sep. 28, 2021

(65) Prior Publication Data
US 2022/0022216 A1 Jan. 20, 2022

Related U.S. Application Data

(63) Continuation of application No. PCT/CN2020/081190, filed on Mar. 25, 2020.

(30) Foreign Application Priority Data

Mar. 29, 2019 (CN) .......................... 201910252651.2

(51) Int. Cl.
H04W 72/1263 (2023.01)
H04L 1/00 (2006.01)
(Continued)

(52) U.S. Cl.
CPC ....... *H04W 72/1263* (2013.01); *H04L 1/0067* (2013.01); *H04W 4/40* (2018.02); *H04W 52/52* (2013.01); *H04W 72/0446* (2013.01)

(58) Field of Classification Search
CPC ... H04W 72/1263; H04W 4/40; H04W 52/52; H04W 72/0446; H04W 72/0453;
(Continued)

(56) References Cited

U.S. PATENT DOCUMENTS 10,075,972 B2  9/2018  Chae et al.
10,382,113 B2  8/2019  Gao et al.
(Continued)

FOREIGN PATENT DOCUMENTS

CN  106209330 A  12/2016
CN  106992847 A   7/2017
(Continued)

OTHER PUBLICATIONS

Machine translation and Orginal of CN-107888528 (Year: 2018).*
(Continued)

*Primary Examiner* — Rina C Pancholi
(74) *Attorney, Agent, or Firm* — Slater Matsil, LLP

(57) ABSTRACT

The communication method and the communications apparatus may be applied to the internet of vehicles, for example, V2X, LTE-V, and V2V. The method includes: A first terminal apparatus determines a scaling factor based on a subcarrier spacing of a first time-frequency resource to be used to send first data and/or a quantity of slots occupied by the first time-frequency resource. The first data is to-be-sent data of the first terminal apparatus, and the first time-frequency resource occupies a single slot or a plurality of consecutive slots. Then, the first terminal apparatus determines, based on the scaling factor, a size of a transmission block carrying the first data, and sends the transmission block carrying the first data to a second terminal apparatus on the first time-frequency resource.

20 Claims, 13 Drawing Sheets

(51) Int. Cl.
*H04W 4/40* (2018.01)
*H04W 52/52* (2009.01)
*H04W 72/0446* (2023.01)

(58) Field of Classification Search
CPC ... H04L 1/0067; H04L 1/0007; H04L 5/0044; H04L 27/2602; H04L 1/0013; H04L 1/0006; H04L 5/0007
See application file for complete search history.

(56) References Cited

U.S. PATENT DOCUMENTS

| | | | |
|---|---|---|---|
| 10,547,410 | B2 | 1/2020 | Einhaus et al. |
| 10,813,129 | B2 | 10/2020 | Li et al. |
| 11,088,808 | B2 | 8/2021 | Hong et al. |
| 2011/0090808 | A1 | 4/2011 | Chen et al. |
| 2013/0195031 | A1 | 8/2013 | Hessler et al. |
| 2013/0308504 | A1 | 11/2013 | Nimbalker et al. |
| 2016/0183302 | A1 | 6/2016 | Chen et al. |
| 2016/0262023 | A1* | 9/2016 | Hiertz ............... H04L 5/0048 |
| 2017/0048905 | A1 | 2/2017 | Yun et al. |
| 2018/0063839 | A1* | 3/2018 | Jung ............... H04L 27/261 |
| 2019/0028162 | A1 | 1/2019 | Lee et al. |
| 2019/0364585 | A1* | 11/2019 | Lee ............... H04W 4/40 |
| 2021/0029688 | A1* | 1/2021 | Zhang ............... H04W 72/0446 |
| 2021/0112505 | A1* | 4/2021 | Li ............... H04L 27/2607 |
| 2021/0153168 | A1* | 5/2021 | Sarkis ............... H04W 72/02 |
| 2021/0211232 | A1 | 7/2021 | Hwang et al. |
| 2021/0352597 | A1* | 11/2021 | Do ............... H04W 72/0453 |

FOREIGN PATENT DOCUMENTS

| | | | | |
|---|---|---|---|---|
| CN | 107113144 | A | 8/2017 | |
| CN | 107888528 | A * | 4/2018 | ........... H04L 1/0015 |
| CN | 107888528 | A | 4/2018 | |
| CN | 108141335 | A | 6/2018 | |
| JP | 2017501610 | A | 1/2017 | |
| JP | 2018534843 | A | 11/2018 | |
| KR | 20180030217 | A | 3/2018 | |
| WO | 2016180097 | A1 | 11/2016 | |
| WO | 2018131922 | A1 | 7/2018 | |
| WO | 2018174564 | A1 | 9/2018 | |

OTHER PUBLICATIONS

3GPP TS 36.211 V15.2.0 (Jun. 2018), 3rd Generation Partnership Project; Technical Specification Group Radio Access Network; Evolved Universal Terrestrial Radio Access (E-UTRA); Physical channels and modulation(Release 15), total 236 pages.
3GPP TS 38.211 V15.3.0 (Sep. 2018), 3rd Generation Partnership Project; Technical Specification Group Radio Access Network; NR; Physical channels and modulation(Release 15), 96 pages.
3GPP TS 36.212 V15.2.1 (Jul. 2018), 3rd Generation Partnership Project; Technical Specification Group Radio Access Network; Evolved Universal Terrestrial Radio Access (E-UTRA); Multiplexing and channel coding(Release 15), 245 pages.
3GPP TS 38.213 V15.2.0 (Jun. 2018), 3rd Generation Partnership Project; Technical Specification Group Radio Access Network; NR; Physical layer procedures for control(Release 15), 99 pages.
3GPP TS 36.213 V15.2.0 (Jun. 2018), 3rd Generation Partnership Project; Technical Specification Group Radio Access Network; Evolved Universal Terrestrial Radio Access (E-UTRA); Physical layer procedures(Release 15), 541 pages.
3GPP TS 38.214 V15.2.0 (Jun. 2018), 3rd Generation Partnership Project; Technical Specification Group Radio Access Network; NR;Physical layer procedures for data (Release 15), 95 pages.
"On PSBCH Pysical Layer Design for V2V Communication," Source: Intel Corporation, Agenda Item: 7.2.1.5.3, Document for; Discussion and Decision, 3GPP TSG RAN WG1 Meeting #86bis, R1-1609461, XP51149501A, Oct. 10-14, 2016, 4 pages.
Ericsson, "Physical layer design of NR sidelink", 3GPP TSG-RAN WG1 Meeting #94, R1-1809302, Göteborg, Sweden, Aug. 20-24, 2018, 10 pages.

* cited by examiner

COMMUNICATION METHOD AND COMMUNICATIONS APPARATUS

CROSS-REFERENCE TO RELATED APPLICATIONS

This application is a continuation of International Application No. PCT/CN2020/081190, filed on Mar. 25, 2020, which claims priority to Chinese Patent Application No. 201910252651.2, filed on Mar. 29, 2019. The disclosures of the aforementioned applications are hereby incorporated by reference in their entireties.

TECHNICAL FIELD

This application relates to the communications field, and in particular, to a communication method and a communications apparatus.

BACKGROUND

Currently, in application scenarios such as intelligent transportation and self driving, a vehicle to everything (V2X) communications technology is usually used. V2X may include vehicle to vehicle (V2V), vehicle to pedestrian (V2P), vehicle to infrastructure (V2I), or the like. However, because a moving speed of a vehicle varies from time to time, for example, an environment of a wireless channel between terminal devices such as a vehicle-mounted device and a mobile phone changes drastically, a wireless signal received by the terminal device may be distorted, for example, a signal amplitude fluctuates and a signal frequency drifts. Consequently, a bit error rate of the terminal device increases.

To resolve the foregoing problem, an automatic gain control (AGC) technology is introduced into an existing long term evolution (LTE)-V2X protocol. Specifically, as shown in FIG. 1, a first terminal apparatus uses the $1^{st}$ symbol (time symbol) in a slot only to send an AGC symbol, and maps, on a symbol different from the $1^{st}$ and the last symbols in the slot, data in a time domain first and frequency domain second mapping mode. Correspondingly, a second terminal apparatus may demodulate and decode the data based on a detection result of the AGC symbol, to help reduce a bit error rate.

However, the foregoing time domain first and frequency domain second mapping mode may be considered as an inter-symbol interleaving (interleaving inter symbols) technology. This facilitates reducing the bit error rate, but the second terminal apparatus can start demodulation and decoding (demodulation & decoding) only after receiving all symbols in the slot. This causes a relatively large processing delay to the second terminal apparatus, and is not applicable to the foregoing application scenario in which the wireless channel changes rapidly. Therefore, how to balance a processing delay and a bit error rate of the second terminal apparatus in the foregoing scenario in which the wireless channel changes rapidly becomes an urgent problem to be resolved.

SUMMARY

Embodiments of this application provide a communication method and a communications apparatus, to reduce a bit error rate and improve receiving performance in a scenario in which a wireless channel changes rapidly.

To achieve the foregoing objective, the following technical solutions are used in this application:

According to a first aspect, a communication method is provided. The communication method includes: A first terminal apparatus determines to-be-sent first data. The first data includes at least one transmission block. Then, the first terminal apparatus maps, starting from the $2^{nd}$ symbol in M symbols in a slot, the first data to the M symbols, and sends the slot carrying the first data to a second terminal apparatus. The M symbols are M consecutive symbols in the slot.

According to the communication method provided in this embodiment of this application, the first terminal apparatus can reserve some symbols at front positions in the slot in a process of mapping the first data to the M symbols. In this way, the second terminal apparatus can perform automatic gain control based on the reserved symbols in a scenario in which a wireless channel changes rapidly, to reduce a bit error rate and improve receiving performance.

For example, the M symbols may be consecutive symbols that are available for sending sidelink data in the slot.

In a possible design method, that the first terminal apparatus maps, starting from the $2^{nd}$ symbol in the M symbols in the slot, the first data to the M symbols may include: The first terminal apparatus maps, starting from the $2^{nd}$ symbol in the M symbols, the first data to symbols that are from the $2^{nd}$ symbol to the last symbol in the M symbols. In other words, the first data is directly mapped to all other M−1 symbols than the $1^{st}$ symbol.

Further, data mapped to the $1^{st}$ symbol in the M symbols may be data mapped to a first symbol. The first symbol may be any one of symbols that are from the $2^{nd}$ symbol to the last symbol in the M symbols. In other words, the $1^{st}$ symbol in the M symbols may be generated by "duplicating" a symbol to which the first data is mapped. The "duplicating" operation cannot cover a resource element (RE) that is originally used to carry a common control/reporting signal such as a reference signal, a synchronization signal, a scheduling assignment signal, or a feedback signal and that is on the $1^{st}$ symbol in the M symbols. Because both the data mapped to the $1^{st}$ symbol in the M symbols and another symbol in the M symbols carry the first data, a signal similarity is relatively high. Therefore, the second terminal apparatus demodulates and decodes, based on an automatic gain control result obtained on the $1^{st}$ symbol in the M symbols, the first data carried on the another symbol in the M symbols. This can improve a demodulation and decoding success rate, to further improve demodulation and decoding performance of the second terminal apparatus in the scenario in which the wireless channel changes drastically.

It is easy to understand that the $1^{st}$ symbol in the M symbols may also be generated in another way in addition to a way of performing the foregoing "duplicating" operation. For example, a random number may be filled in an RE other than the RE occupied by the common signal.

In this application, the M symbols may be all or partial symbols in the slot. This is not limited in this embodiment of this application.

For example, the last symbol in the M symbols may be the last symbol in the slot or a penultimate symbol in the slot.

For example, the $1^{st}$ symbol in the M symbols may be any one of the $1^{st}$ symbol, the $2^{nd}$ symbol, the $3^{rd}$ symbol, or the $4^{th}$ symbol in the slot.

It may be understood that when the M symbols are the partial symbols in the slot, a symbol other than the M symbols in the slot may be allocated to another user, or may be idle. This is not limited in this application.

The $1^{st}$ symbol in the M symbols may alternatively be determined based on a subcarrier spacing. A larger subcarrier spacing needs to be configured when a wireless channel status changes more drastically. Correspondingly, the second terminal apparatus also needs to use more symbols to complete automatic gain control, to implement more accurate gain control, and improve the demodulation and decoding performance.

Optionally, when a subcarrier spacing corresponding to the slot is 15 kilohertz kHz or 30 kHz, the $1^{st}$ symbol in the M symbols may be the $1^{st}$ symbol or the $2^{nd}$ symbol in the slot.

Optionally, when the subcarrier spacing corresponding to the slot is 60 kHz or 120 kHz, the $1^{st}$ symbol in the M symbols may be the 3rd symbol or the $4^{th}$ symbol in the slot.

In a possible design method, that the first terminal apparatus determines the to-be-sent first data may include: The first terminal apparatus determines a scaling factor based on a first parameter, determines, based on the scaling factor, a size of a transmission block included in the first data, and then determines, based on the size of the transmission block, a quantity of transmission blocks included in the first data. The first parameter includes at least one of a size of the first data, a quantity of time-frequency resources that are in the M symbols and that can be used to send the first data, or a modulation and coding scheme to be used to send the first data.

The slot may be a single slot, or may be one of a plurality of consecutive slots used to send the first data. This is not limited herein. Optionally, when the slot is one of the plurality of consecutive slots, the first terminal apparatus determines the scaling factor based on a second parameter. The second parameter includes at least one of the following parameters: a quantity of the consecutive slots used to send the first data, a number of the slot in the consecutive slots used to send the first data, or the subcarrier spacing of the slot.

When a quantity of available time-frequency resources on the M symbols, for example, the available time-frequency resources, is greater than or less than a resource requirement of the first data, rate matching or puncturing further needs to be performed on the M symbols. Therefore, optionally, the communication method described in the first aspect may further include: The first terminal apparatus performs, on the M symbols, rate matching or puncturing on the first data.

It should be noted that rate matching or puncturing may be performed according to a preset rule known to both the first terminal apparatus and the second terminal apparatus, or may be independently determined by the first terminal apparatus based on a channel status fed back by the second terminal apparatus and an automatic gain control capability of the second terminal apparatus. It is easy to understand that if the rate matching operation or the puncturing operation is performed according to a unique preset rule, the first terminal apparatus does not need to notify the second terminal apparatus. However, if the first terminal apparatus independently selects a rule from a plurality of preset rules, and performs the rate matching operation or the puncturing operation according to the selected rule, or the first terminal apparatus independently determines the rate matching operation or the puncturing operation based on the channel status fed back by the second terminal apparatus and the automatic gain control capability of the second terminal apparatus, the first terminal apparatus further needs to notify the second terminal apparatus of an operation performed by the first terminal apparatus. Therefore, optionally, the first terminal apparatus sends first indication information. The first indication information is used to indicate that the first terminal apparatus performs rate matching or puncturing on the first data.

One or more symbols located foremost in the M symbols in time domain are usually used for automatic gain control. For example, the $1^{st}$ symbol in the M symbols may be used by the second terminal apparatus to perform automatic gain control. Alternatively, the $1^{st}$ and the $2^{nd}$ symbols in the M symbols are to be used by the second terminal apparatus to perform automatic gain control. Alternatively, the $1^{st}$ to the $4^{th}$ symbols in the M symbols are to be used by the second terminal apparatus to perform automatic gain control.

According to a second aspect, another communication method is provided. The communication method includes: A first terminal apparatus determines a scaling factor based on a subcarrier spacing of a first time-frequency resource to be used to send first data and/or a quantity of slots occupied by the first time-frequency resource. The first data is to-be-sent data of the first terminal apparatus, and the first time-frequency resource occupies a single slot or a plurality of consecutive slots. Then, the first terminal apparatus determines, based on the scaling factor, a size of a transmission block carrying the first data, and sends the transmission block carrying the first data to a second terminal apparatus on the first time-frequency resource.

According to the communication method provided in this application, the scaling factor and the size of the transmission block of the first data can be determined based on the subcarrier spacing of the first time-frequency resource and/or the quantity of slots occupied by the first time-frequency resource, and an adjusted transmission block of the first data is sent to the second terminal apparatus on the first time-frequency resource. In other words, as the subcarrier spacing and/or a quantity of available slots change (or changes), a quantity of time-frequency resources carrying the first data also changes. The first terminal apparatus can dynamically adjust, based on the time-frequency resource change, a data amount of the first data carried in the single slot or the plurality of consecutive slots. This can avoid an error in demodulating and decoding the first data due to insufficient time-frequency resources, and improve data transmission reliability.

Optionally, the communication method described in the second aspect may further include: The first terminal apparatus sends first indication information. The first indication information is used to indicate that the first terminal apparatus determines, in the single slot or a plurality of consecutive slots, the size of the transmission block carrying the first data based on the scaling factor.

In a possible design method, the first time-frequency resource may occupy the single slot. Correspondingly, that the first terminal apparatus determines the scaling factor based on the subcarrier spacing of the first time-frequency resource to be used to send the first data and/or the quantity of slots occupied by the first time-frequency resource may include the following step: The first terminal apparatus determines a quantity of feature symbols in the single slot based on the subcarrier spacing. The subcarrier spacing is positively correlated with the quantity of feature symbols in the single slot. Then, the first terminal apparatus determines the scaling factor based on the quantity of feature symbols in the single slot.

For example, that the subcarrier spacing is positively correlated with the quantity of feature symbols in the single slot may include: The subcarrier spacing is 15 kHz, and the quantity of feature symbols in the single slot is 2; the subcarrier spacing is 30 kHz or 60 kHz, and the quantity of feature symbols in the single slot is 2 or 3; or the subcarrier spacing is 120 kHz or 240 kHz, and the quantity of feature symbols in the single slot is 3 or 5.

Further, that the first terminal apparatus determines the scaling factor based on the quantity of feature symbols in the single slot may include: The first terminal apparatus determines the scaling factor based on a quantity of symbols other than the feature symbol in the single slot.

In another possible design method, the first time-frequency resource may alternatively occupy the plurality of consecutive slots. Correspondingly, that the first terminal apparatus determines the scaling factor based on the subcarrier spacing of the first time-frequency resource to be used to send the first data and/or the quantity of slots occupied by the first time-frequency resource may include: The first terminal apparatus determines a quantity of feature symbols in each slot in the plurality of consecutive slots based on the subcarrier spacing and a quantity of the plurality of consecutive slots. Then, the first terminal apparatus determines, based on the quantity of feature symbols in each slot in the plurality of consecutive slots, a scaling factor corresponding to the slot in the plurality of consecutive slots. The subcarrier spacing is positively correlated with the quantity of feature symbols in each slot in the plurality of consecutive slots.

For example, that the subcarrier spacing is positively correlated with the quantity of feature symbols in each slot in the plurality of consecutive slots may include: The subcarrier spacing is 15 kHz, and a quantity of feature symbols in the $1^{st}$ slot in the plurality of consecutive slots is 1; the subcarrier spacing is 30 kHz or 60 kHz, and a quantity of feature symbols in the $1^{st}$ slot in the plurality of consecutive slots is 1 or 2; or the subcarrier spacing is 120 kHz or 240 kHz, and a quantity of feature symbols in the $1^{st}$ slot in the plurality of consecutive slots is 2 or 4.

It is easy to understand that, because quantities of available time-frequency resources in different slots in the plurality of consecutive slots are different, scaling factors corresponding to the different slots also need to be adjusted accordingly. For example, a symbol to be used to perform automatic gain control needs to be reserved in the $1^{st}$ slot in the plurality of consecutive slots, and the last symbol in the last slot is a null symbol. Therefore, optionally, a scaling factor corresponding to the $1^{st}$ slot in the plurality of consecutive slots is different from a scaling factor corresponding to the last slot in the plurality of consecutive slots.

Actually, the plurality of consecutive slots may further include an intermediate slot. The intermediate slot is any slot other than the $1^{st}$ and the last slots in the plurality of consecutive slots. Therefore, optionally, a scaling factor corresponding to the intermediate slot is different from the scaling factor corresponding to the $1^{st}$ slot; and/or a scaling factor corresponding to the intermediate slot is different from the scaling factor corresponding to the last slot.

It is easy to understand that the plurality of consecutive slots may include a plurality of intermediate slots. Therefore, further, scaling factors corresponding to the plurality of intermediate slots are the same.

Further, in the plurality of consecutive slots, a redundancy version of the first data sent in the $1^{st}$ slot is different from a redundancy version of the first data sent in the last slot; and/or a redundancy version of the first data sent in the $1^{st}$ slot is different from a redundancy version of the first data sent in any one of the intermediate slots; and/or a redundancy version of the first data sent in the last slot is different from a redundancy version of the first data sent in any one of the intermediate slots; and/or redundancy versions of the first data sent in different slots in the plurality of intermediate slots are the same. Redundancy versions of the sent first data are different, and this can maximally use a resource and avoid a waste. Redundancy versions of the first data sent in the plurality of intermediate slots are the same, and this can reduce complexity of a modulation and coding operation.

When a channel status is relatively poor, the first data may alternatively be repeatedly sent in each slot in the plurality of consecutive slots, to improve a data transmission success rate. In this case, the scaling factors corresponding to the different slots in the plurality of consecutive slots are the same. It is easy to understand that a same scaling factor applicable to all of the plurality of consecutive slots may be determined based on a quantity of available resources in any one of the plurality of consecutive slots.

Optionally, the communication method described in the second aspect may further include: The first terminal apparatus determines, based on a quantity of feature symbols in a first slot in the plurality of consecutive slots, the scaling factor applicable to all of the plurality of consecutive slots. The first slot is any slot in the plurality of consecutive slots.

Optionally, the first slot may be the $1^{st}$ slot in the plurality of consecutive slots. Because there are fewer available resources in the $1^{st}$ slot, the determined scaling factor is relatively small. Therefore, a data carrying capability of the $1^{st}$ slot may be less than a data carrying capability of any other slot. Therefore, correspondingly, the communication method described in the second aspect may further include: The first terminal apparatus performs a rate matching operation on the transmission block in one or more slots other than the first slot in the plurality of consecutive slots. For example, a lower bit rate may be used in another slot, to improve receiving performance.

Optionally, the first slot may alternatively be the last slot in the plurality of consecutive slots. A quantity of available resources in the last slot is usually greater than a quantity of available resources in the $1^{st}$ slot and less than a quantity of available resources in the intermediate slot. Correspondingly, the communication method described in the second aspect further includes one or more of the following operations: The first terminal apparatus punctures the transmission block in the $1^{st}$ slot in the plurality of consecutive slots; and/or the first terminal apparatus performs rate matching on the transmission block in any slot other than the $1^{st}$ and the last slots in the plurality of consecutive slots.

Optionally, the first slot may alternatively be any slot other than the $1^{st}$ and the last slots in the plurality of consecutive slots, namely, the intermediate slot. Correspondingly, the communication method described in the second aspect may further include: The first terminal apparatus punctures the transmission block in the $1^{st}$ slot and/or the last slot in the plurality of consecutive slots.

For example, the feature symbol may include at least one of the following symbols: the symbol to be used to perform automatic gain control, the null symbol, a symbol used to determine the scaling factor, or a symbol to which the first data is not directly mapped.

In the foregoing possible implementations, the quantity of feature symbols is first determined based on the subcarrier spacing, and then the scaling factor is determined. Actually, the scaling factor corresponding to the single slot or each of the plurality of consecutive slots or the scaling factor corresponding to the plurality of consecutive slots may alternatively be determined directly based on the subcarrier spacing, without considering the feature symbol.

When a wireless channel status is an extremely poor, all of the plurality of consecutive slots may alternatively be only used to send one transmission block of the first data, in other words, the transmission block is sent only once in all the slots, to reduce a bit rate and improve a demodulation and decoding success rate. Therefore, in a possible implementation, that the first terminal apparatus determines the scaling factor based on the subcarrier spacing of the first time-frequency resource to be used to send the first data and/or the quantity of slots occupied by the first time-frequency resource may include: The first terminal apparatus determines, based on the subcarrier spacing and a quantity of the plurality of consecutive slots, one scaling factor corresponding to the plurality of consecutive slots.

In another possible implementation, that the first terminal apparatus determines the scaling factor based on the subcarrier spacing of the first time-frequency resource to be used to send the first data and/or the quantity of slots occupied by the first time-frequency resource may include: When the subcarrier spacing is 15 kHz or 30 kHz, the first terminal apparatus determines the scaling factor based on a symbol other than the $1^{st}$ and the last symbols in the single slot. Alternatively, when the subcarrier spacing is 30 kHz, 60 kHz, or 120 kHz, the first terminal apparatus determines the scaling factor based on a symbol other than the $1^{st}$, the $2^{nd}$, and the last symbols in the single slot. Alternatively, when the subcarrier spacing is 120 kHz or 240 kHz, the first terminal apparatus determines the scaling factor based on a symbol other than the $1^{st}$ to the $4^{th}$ and the last symbols in the single slot.

In still another possible implementation, that the first terminal apparatus determines the scaling factor based on the subcarrier spacing of the first time-frequency resource to be used to send the first data and/or the quantity of slots occupied by the first time-frequency resource may further include: When the subcarrier spacing is 15 kHz or 30 kHz, the first terminal apparatus determines the scaling factor based on a symbol other than the $1^{st}$ symbol in the $1^{st}$ slot in the plurality of consecutive slots. Alternatively, when the subcarrier spacing is 30 kHz, 60 kHz, or 120 kHz, the first terminal apparatus determines the scaling factor based on a symbol other than the $1^{st}$ and the $2^{nd}$ symbols in the $1^{st}$ slot in the plurality of consecutive slots. Alternatively, when the subcarrier spacing is 120 kHz or 240 kHz, the first terminal apparatus determines the scaling factor based on a symbol other than the $1^{st}$ to the $4^{th}$ symbols in the $1^{st}$ slot in the plurality of consecutive slots. Alternatively, the first terminal apparatus determines the scaling factor based on a symbol other than the last symbol in the last slot in the plurality of consecutive slots.

According to a third aspect, a communication method is provided. The communication method includes: A first terminal apparatus determines a first symbol set and a second symbol set that are of first data and that are in a slot. The second symbol set is located, in time domain, after the first symbol set, and the first symbol set and the second symbol set are consecutive. Then, the first terminal apparatus maps the first data to the slot in the following mode to obtain second data: mapping the first data to the first symbol set in a time domain first and frequency domain second mapping mode and mapping the first data to the second symbol set in a frequency domain first and time domain second mapping mode, and sends the second data.

According to the communication method provided in this application, the first data can be mapped to the first symbol set in the slot in the time domain first and frequency domain second mapping mode, and mapped to the second symbol set in the frequency domain first and time domain second mapping mode, to generate the second data, and the second data is sent. This can avoid the following problems: When data is mapped to all symbols in a slot in the time domain first and frequency domain second mapping mode, a second terminal apparatus can start decoding only after receiving all the symbols in the slot, and as a result, a relatively large data transmission delay is caused; when data is mapped to all symbols in a slot in the frequency domain first and time domain second mapping mode, the symbols are not interleaved, and as a result, demodulation and decoding performance of the second terminal apparatus deteriorates greatly in a scenario in which a wireless channel changes drastically. In this way, actual requirements for a data transmission delay and demodulation and decoding performance can be considered, and this can improve reliability and efficiency of data transmission in the scenario in which the wireless channel changes drastically.

For example, the first symbol set includes the $1^{st}$ symbol in the slot, and one symbol or a plurality of consecutive symbols that is or are located after the $1^{st}$ symbol in time domain and that is or are adjacent to the $1^{st}$ symbol.

In a possible design method, that the first terminal apparatus determines the first symbol set and the second symbol set that are of the first data and that are in the slot may include: The first terminal apparatus determines, based on a symbol that is occupied by control information and that is in the slot, the first symbol set.

Optionally, the first symbol set includes the symbol occupied by the control information.

Further, the first symbol set may include one symbol or a plurality of consecutive symbols that is or are located, in time domain, after the symbol occupied by the control information and that is or are adjacent to the last symbol occupied by the control information.

In another possible design method, that the first terminal apparatus determines the first symbol set and the second symbol set that are of the first data and that are in the slot may include: The first terminal apparatus determines, based on a symbol that is occupied by a demodulation reference signal DMRS and that is in the slot, the first symbol set. The first symbol set includes a symbol, in the slot, occupied by the $1^{st}$ DMRS.

Optionally, the first symbol set includes all symbols, in the slot, located before a symbol occupied by the $2^{nd}$ DMRS.

Further, the first symbol set includes the symbol, in the slot, occupied by the $2^{nd}$ DMRS.

Still further, the first symbol set includes one symbol or a plurality of consecutive symbols that is or are located, in time domain, after the symbol occupied by the $2^{nd}$ DMRS and that is or are adjacent to the symbol occupied by the $2^{nd}$ DMRS.

In still another possible design method, that the first terminal apparatus determines the first symbol set and the second symbol set that are in the slot may include: The first terminal apparatus determines, based on a total quantity of symbols included in the slot, the first symbol set.

The total quantity of symbols included in the slot one-to-one corresponds to the first symbol set.

Optionally, that the first terminal apparatus determines, based on the total quantity of symbols included in the slot, the first symbol set may include: The first terminal apparatus determines, according to any one of the following formulas, a quantity of symbols included in the first symbol set: $N_1=\lfloor L/2 \rfloor$, $N_1=\lceil L/2 \rceil$, $N_1=\lfloor L/2 \rfloor - K_1$, or $N_1=\lfloor L/2 \rfloor + K_2$. $N_1$ is the quantity of symbols included in the first symbol set, L is the total quantity of symbols included in the slot, $K_1$ and $K_2$ are preset offsets, the operator ⌊ ⌋ represents rounding down, and the operator ⌈ ⌉ represents rounding up. The first terminal apparatus adds $N_1$ symbols located foremost in the slot in time domain to the first symbol set.

In a possible design method, before the first terminal apparatus determines, according to any one of the following formulas, the quantity of symbols included in the first symbol set, the communication method described in the third aspect may further include: The first terminal apparatus determines that the total quantity of symbols included in the slot is greater than a first symbol quantity threshold.

Optionally, that the first terminal apparatus determines, based on the total quantity of symbols included in the slot, the first symbol set may include: If the total quantity of symbols included in the slot is less than a second symbol quantity threshold, the first terminal apparatus determines that the first symbol set includes all symbols in the slot and the second symbol set is null.

In another possible design method, before the first terminal apparatus determines the first symbol set and the second symbol set that are in the slot, the communication method described in the third aspect may further include: The first terminal apparatus determines that the first symbol set includes a feature symbol. There are one or two feature symbols located foremost in the slot in time domain.

Optionally, that the first terminal apparatus determines that the first symbol set includes the feature symbol may include: The first terminal apparatus determines, based on one or more of the following items, that the first symbol set includes the feature symbol: a quantity of slots consecutively occupied for transmitting the first data, numbers of a plurality of slots occupied by the first data, a subcarrier spacing to be used to transmit the first data, a size of the first data, bandwidth of a frequency domain resource for transmitting the first data, a quantity of symbols that can be used to send the first data, a modulation and coding scheme to be used to send the first data, or channel state information of a current resource or resource pool.

In a possible design method, the communication method described in the third aspect may further include: The first terminal apparatus sends sixth indication information. The sixth indication information is used to indicate whether the slot includes the feature symbol.

In a possible design method, the communication method described in the third aspect may further include: The first terminal apparatus sends seventh indication information. The seventh indication information includes one or more types of the following information: the quantity of symbols included in the first symbol set, whether the first symbol set exists, or whether the second symbol set exists.

For example, the feature symbol includes at least one of the following symbols: a symbol to be used to perform automatic gain control, a symbol used to determine to perform a scaling operation on a transmission block of the first data, a symbol used to determine to perform a rate matching operation on a transmission block of the first data, or a symbol used to determine to perform a puncturing operation on a transmission block of the first data.

According to a fourth aspect, a communications apparatus is provided. The communications apparatus is used as a first terminal apparatus to communicate with a second terminal apparatus. The communications apparatus includes a processing module and a sending module. The processing module is configured to determine to-be-sent first data. The first data includes at least one transmission block. The processing module is further configured to map, starting from the $2^{nd}$ symbol in M symbols in a slot, the first data to the M symbols, where the M symbols are M consecutive symbols in the slot. The sending module is configured to send the slot carrying the first data to the second terminal apparatus.

For example, the M symbols may be consecutive symbols that are available for sending sidelink data in the slot.

In a possible design, the processing module is further configured to map, starting from the $2^{nd}$ symbol in the M symbols, the first data to symbols that are from the $2^{nd}$ symbol to the last symbol in the M symbols.

Further, data mapped to the $1^{st}$ symbol in the M symbols is data mapped to a first symbol. The first symbol may be any one of symbols that are from the $2^{nd}$ symbol to the last symbol in the M symbols.

For example, the last symbol in the M symbols may be the last symbol in the slot or a penultimate symbol in the slot.

For example, the $1^{st}$ symbol in the M symbols may be any one of the $1^{st}$ symbol, the $2^{nd}$ symbol, the $3^{rd}$ symbol, or the $4^{th}$ symbol in the slot.

Optionally, when a subcarrier spacing corresponding to the slot is 15 kilohertz kHz or 30 kHz, the $1^{st}$ symbol in the M symbols may be the $1^{st}$ symbol or the $2^{nd}$ symbol in the slot.

Optionally, when the subcarrier spacing corresponding to the slot is 60 kHz or 120 kHz, the $1^{st}$ symbol in the M symbols may be the 3rd symbol or the $4^1$ symbol in the slot.

In a possible design, the processing module is further configured to determine a scaling factor based on a first parameter. The first parameter includes at least one of a size of the first data, a quantity of time-frequency resources that are in the M symbols and that can be used to send the first data, or a modulation and coding scheme to be used to send the first data. The processing module is further configured to determine a size of a transmission block based on the scaling factor. The processing module is further configured to determine, based on the size of the transmission block, a quantity of transmission blocks included in the first data.

Optionally, the slot is one of a plurality of consecutive slots used to send the first data. Correspondingly, the processing module is further configured to determine the scaling factor based on a second parameter. The second parameter includes at least one of the following parameters: a quantity of the consecutive slots used to send the first data, a number of the slot in the consecutive slots used to send the first data, or the subcarrier spacing of the slot.

Optionally, the sending module is further configured to send first indication information to the second terminal apparatus. The first indication information is used to indicate that the first terminal apparatus performs rate matching or puncturing on the first data.

For example, the $1^{st}$ symbol in the M symbols may be used by the second terminal apparatus to perform automatic gain control. Alternatively, the $1^{st}$ and the $2^{nd}$ symbols in the M symbols may be used by the second terminal apparatus to perform automatic gain control. Alternatively, the $1^{st}$ to the $4^{th}$ symbols in the M symbols may be used by the second terminal apparatus to perform automatic gain control.

According to a fifth aspect, a communications apparatus is provided. The communications apparatus is used as a first terminal apparatus to communicate with a second terminal apparatus. The communications apparatus includes a processing module and a sending module. The processing module is configured to determine a scaling factor based on a subcarrier spacing of a first time-frequency resource to be used to send first data and/or a quantity of slots occupied by the first time-frequency resource. The first data is to-be-sent data of the first terminal apparatus, and the first time-frequency resource occupies a single slot or a plurality of consecutive slots. The processing module is further configured to determine, based on the scaling factor, a size of a transmission block carrying the first data. The sending module is configured to send the transmission block carrying the first data to the second terminal apparatus on the first time-frequency resource.

Optionally, the sending module is further configured to send first indication information. The first indication information is used to indicate that the first terminal apparatus determines, in the single slot or the plurality of consecutive slots, the size of the transmission block carrying the first data based on the scaling factor.

In a possible design, the first time-frequency resource may occupy the single slot. Correspondingly, the processing module is further configured to determine a quantity of feature symbols in the single slot based on the subcarrier spacing. The subcarrier spacing is positively correlated with the quantity of feature symbols in the single slot. The processing module is further configured to determine the scaling factor based on the quantity of feature symbols in the single slot.

For example, that the subcarrier spacing is positively correlated with the quantity of feature symbols in the single slot may include: The subcarrier spacing is 15 kHz, and the quantity of feature symbols in the single slot is 2. Alternatively, the subcarrier spacing is 30 kHz or 60 kHz, and the quantity of feature symbols in the single slot is 2 or 3. Alternatively, the subcarrier spacing is 120 kHz or 240 kHz, and the quantity of feature symbols in the single slot is 3 or 5.

Further, the processing module is configured to determine the scaling factor based on a quantity of symbols other than the feature symbol in the single slot.

In another possible design, the first time-frequency resource may occupy the plurality of consecutive slots. Correspondingly, the processing module is further configured to determine a quantity of feature symbols in each slot in the plurality of consecutive slots based on the subcarrier spacing and a quantity of the plurality of consecutive slots. The subcarrier spacing is positively correlated with the quantity of feature symbols in each slot in the plurality of consecutive slots. The processing module is further configured to determine, based on the quantity of feature symbols in each slot in the plurality of consecutive slots, a scaling factor corresponding to the slot in the plurality of consecutive slots.

For example, that the subcarrier spacing is positively correlated with the quantity of feature symbols in each slot in the plurality of consecutive slots may include: The subcarrier spacing is 15 kHz, and a quantity of feature symbols in the $1^{st}$ slot in the plurality of consecutive slots is 1. Alternatively, the subcarrier spacing is 30 kHz or 60 kHz, and a quantity of feature symbols in the $1^{st}$ slot in the plurality of consecutive slots is 1 or 2. Alternatively, the subcarrier spacing is 120 kHz or 240 kHz, and a quantity of feature symbols in the $1^{st}$ slot in the plurality of consecutive slots is 2 or 4.

Optionally, a scaling factor corresponding to the $1^{st}$ slot in the plurality of consecutive slots is different from a scaling factor corresponding to the last slot in the plurality of consecutive slots.

Optionally, the plurality of consecutive slots may further include an intermediate slot. The intermediate slot may be any slot other than the $1^{st}$ and the last slots in the plurality of consecutive slots. Correspondingly, a scaling factor corresponding to the intermediate slot is different from the scaling factor corresponding to the $1^{st}$ slot; and/or a scaling factor corresponding to the intermediate slot is different from the scaling factor corresponding to the last slot.

It is easy to understand that the plurality of consecutive slots may include a plurality of intermediate slots. Correspondingly, scaling factors corresponding to the plurality of intermediate slots are the same.

Further, a redundancy version of the first data sent in the $1^{st}$ slot is different from a redundancy version of the first data sent in the last slot; and/or a redundancy version of the first data sent in the $1^{st}$ slot is different from a redundancy version of the first data sent in any one of the intermediate slots; and/or a redundancy version of the first data sent in the last slot is different from a redundancy version of the first data sent in any one of the intermediate slots; and/or redundancy versions of the first data sent in different slots in the intermediate slots are the same.

Optionally, the processing module is further configured to: after the first terminal apparatus determines the quantity of feature symbols in each slot in the plurality of consecutive slots based on the subcarrier spacing and the quantity of the plurality of consecutive slots, determine, based on a quantity of feature symbols in a first slot in the plurality of consecutive slots, a scaling factor applicable to each slot in the plurality of consecutive slots. The first slot may be any slot in the plurality of consecutive slots.

Optionally, the first slot may be the $1^{st}$ slot in the plurality of consecutive slots. Correspondingly, the processing module is further configured to perform rate matching on the transmission block in one or more slots other than the first slot in the plurality of consecutive slots.

Optionally, the first slot may be the last slot in the plurality of consecutive slots. Correspondingly, the processing module is further configured to puncture the transmission block in the $1^{st}$ slot in the plurality of consecutive slots; and/or the processing module is further configured to perform rate matching on the transmission block in any slot other than the $1^{st}$ and the last slots in the plurality of consecutive slots.

Optionally, the first slot may be any slot other than the $1^{st}$ and the last slots in the plurality of consecutive slots. Correspondingly, the processing module is further configured to puncture the transmission block in the $1^{st}$ slot and/or the last slot in the plurality of consecutive slots.

For example, the feature symbol may include at least one of the following symbols: a symbol to be used to perform automatic gain control, a null symbol, a symbol used to determine the scaling factor, or a symbol to which the first data is not directly mapped.

In a possible implementation, all of the plurality of consecutive slots are only used to send one transmission block of the first data. Correspondingly, the processing module is further configured to determine, based on the subcarrier spacing and a quantity of the plurality of consecutive slots, one scaling factor corresponding to the plurality of consecutive slots.

In another possible implementation, the first time-frequency resource may occupy the single slot. Correspondingly, the processing module is further configured to: when the subcarrier spacing is 15 kHz or 30 kHz, determine the scaling factor based on a symbol other than the $1^{st}$ and the last symbols in the single slot. Alternatively, the processing module is further configured to: when the subcarrier spacing is 30 kHz, 60 kHz, or 120 kHz, determine the scaling factor based on a symbol other than the $1^{st}$, the $2^{nd}$, and the last symbols in the single slot. Alternatively, the processing module is further configured to: when the subcarrier spacing is 120 kHz or 240 kHz, determine the scaling factor based on a symbol other than the $1^{st}$ to the $4^{th}$ and the last symbols in the single slot.

In still another possible implementation, the first time-frequency resource may occupy the plurality of consecutive slots. Correspondingly, the processing module is further configured to: when the subcarrier spacing is 15 kHz or 30 kHz, determine the scaling factor based on a symbol other than the $1^{st}$ symbol in the $1^{st}$ slot in the plurality of consecutive slots. Alternatively, the processing module is further configured to: when the subcarrier spacing is 30 kHz, 60 kHz, or 120 kHz, determine the scaling factor based on a symbol other than the $1^{st}$ and the $2^{nd}$ symbols in the $1^{st}$ slot in the plurality of consecutive slots. Alternatively, the processing module is further configured to: when the subcarrier spacing is 120 kHz or 240 kHz, determine the scaling factor based on a symbol other than the $1^{st}$ to the $4^{th}$ symbols in the $1^{st}$ slot in the plurality of consecutive slots. Alternatively, the processing module is further configured to determine the scaling factor based on a symbol other than the last symbol in the last slot in the plurality of consecutive slots.

According to a sixth aspect, a communications apparatus is provided. The communications apparatus is used as a first terminal apparatus to communicate with a second terminal apparatus. The communications apparatus includes a processing module and a sending module. The processing module is configured to determine a first symbol set and a second symbol set that are of first data and that are in a slot. The second symbol set is located, in time domain, after the first symbol set, and the first symbol set and the second symbol set are consecutive. The processing module is further configured to map the first data to the slot in the following mode to obtain second data: mapping the first data to the first symbol set in a time domain first and frequency domain second mapping mode and mapping the first data to the second symbol set in a frequency domain first and time domain second mapping mode. The sending module is configured to send a transmission block carrying the first data.

For example, the first symbol set may include the $1^{st}$ symbol in the slot, and one symbol or a plurality of consecutive symbols that is or are located after the $1^{st}$ symbol in time domain and that is or are adjacent to the $1^{st}$ symbol.

In a possible design, the processing module is further configured to determine, based on a symbol that is occupied by control information and that is in the slot, the first symbol set.

Optionally, the first symbol set may include the symbol occupied by the control information.

Further, the first symbol set may include one symbol or a plurality of consecutive symbols that is or are located, in time domain, after the symbol occupied by the control information and that is or are adjacent to the last symbol occupied by the control information.

In another possible design, the processing module is further configured to determine, based on a symbol that is occupied by a demodulation reference signal DMRS and that is in the slot, the first symbol set. The first symbol set may include a symbol, in the slot, occupied by the $1^{st}$ DMRS.

Optionally, the first symbol set may include all symbols, in the slot, located before a symbol occupied by the $2^{nd}$ DMRS.

Further, the first symbol set may include the symbol, in the slot, occupied by the $2^{nd}$ DMRS.

Still further, the first symbol set may include one symbol or a plurality of consecutive symbols that is or are located, in time domain, after the symbol occupied by the $2^{nd}$ DMRS and that is or are adjacent to the symbol occupied by the $2^{nd}$ DMRS.

In still another possible design, the processing module is further configured to determine, based on a total quantity of symbols included in the slot, the first symbol set.

The total quantity of symbols included in the slot one-to-one corresponds to the first symbol set.

Optionally, the processing module is further configured to determine, according to any one of the following formulas, a quantity of symbols included in the first symbol set: $N_1=\lfloor L/2 \rfloor$, $N_1=\lceil L/2 \rceil$, $N_1=\lfloor L/2 \rfloor-K_1$, or $N_1=\lfloor L/2 \rfloor+K_2$. $N_1$ is the quantity of symbols included in the first symbol set, L is the total quantity of symbols included in the slot, $K_1$ and $K_2$ are preset offsets, the operator $\lfloor \; \rfloor$ represents rounding down, and the operator $\lceil \; \rceil$ represents rounding up. The first terminal apparatus adds $N_1$ symbols located foremost in the slot in time domain to the first symbol set.

In a possible design, the processing module is further configured to: before the first terminal apparatus determines, according to any one of the following formulas, the quantity of symbols included in the first symbol set, determine that the total quantity of symbols included in the slot is greater than a first symbol quantity threshold.

Optionally, the processing module is further configured to: if the total quantity of symbols included in the slot is less than a second symbol quantity threshold, determine that the first symbol set includes all symbols in the slot and the second symbol set is null.

In another possible design, the processing module is further configured to: before the first terminal apparatus determines the first symbol set and the second symbol set that are in the slot, determine that the first symbol set includes a feature symbol. There may be one or two feature symbols located foremost in the slot in time domain.

Optionally, the processing module is further configured to determine, based on one or more of the following items, that the first symbol set includes the feature symbol: a quantity of slots consecutively occupied for transmitting the first data, numbers of a plurality of slots consecutively occupied by the first data, a subcarrier spacing to be used to transmit the first data, a size of the first data, bandwidth of a frequency domain resource for transmitting the first data, a quantity of symbols that can be used to send the first data, a modulation and coding scheme to be used to send the first data, or channel state information of a current resource or resource pool.

In a possible design, the sending module is further configured to send indication information to the second terminal apparatus. The indication information may be used to indicate one or more types of the following information: whether the slot includes the feature symbol, the quantity of symbols included in the first symbol set, whether the first symbol set exists, or whether the second symbol set exists.

For example, the feature symbol may include at least one of the following symbols: a symbol to be used to perform automatic gain control, a symbol used to determine to perform a scaling operation on the transmission block of the first data, a symbol used to determine to perform a rate matching operation on the transmission block of the first data, or a symbol used to determine to perform a puncturing operation on the transmission block of the first data.

According to a seventh aspect, a communication method is provided. The communication method includes: A second terminal apparatus receives, from a first terminal apparatus, a transmission block carrying first data. Then, the second terminal apparatus determines a scaling factor based on a subcarrier spacing of a first time-frequency resource of the first data and/or a quantity of slots occupied by the first time-frequency resource. The first time-frequency resource occupies a single slot or a plurality of consecutive slots. The second terminal apparatus determines, based on the scaling factor, a size of the transmission block carrying the first data, and performs a decoding operation based on the size of the transmission block.

For a technical effect of the communication method provided in the seventh aspect, refer to the second aspect. Details are not described herein again.

According to an eighth aspect, a communications apparatus is provided. The communications apparatus is used as a second terminal apparatus to communicate with a first terminal apparatus. The communications apparatus includes a processing module and a receiving module. The receiving module is further configured to receive, from the first terminal apparatus, a transmission block carrying first data. The processing module is further configured to determine a scaling factor based on a subcarrier spacing of a first time-frequency resource of the first data and/or a quantity of slots occupied by the first time-frequency resource. The first time-frequency resource occupies a single slot or a plurality of consecutive slots. The processing module is further configured to determine, based on the scaling factor, a size of the transmission block carrying the first data, and perform a decoding operation based on the size of the transmission block.

According to a ninth aspect, a communications apparatus is provided, including a processor and a memory. The memory is configured to store a computer instruction. When the processor executes the instruction, the communications apparatus is enabled to perform the communication method described in any implementation in the first to the third and the seventh aspects. The communications apparatus may be the first terminal apparatus or the second terminal apparatus in the first to the third and the seventh aspects.

According to a tenth aspect, a communications system is provided. The system includes the foregoing first terminal apparatus and the foregoing second terminal apparatus.

According to an eleventh aspect, a computer-readable storage medium is provided. The computer-readable storage medium stores a computer instruction. When the computer instruction is run on a computer, the computer is enabled to perform the communication method described in any implementation in the first to the third and the seventh aspects.

According to a twelfth aspect, a computer program product including an instruction is provided. The computer program product includes a computer program or instruction. When the computer program or instruction is run on a computer, the computer is enabled to perform the communication method described in any implementation in the first to the third and the seventh aspects.

DESCRIPTION OF EMBODIMENTS

Figure 1:
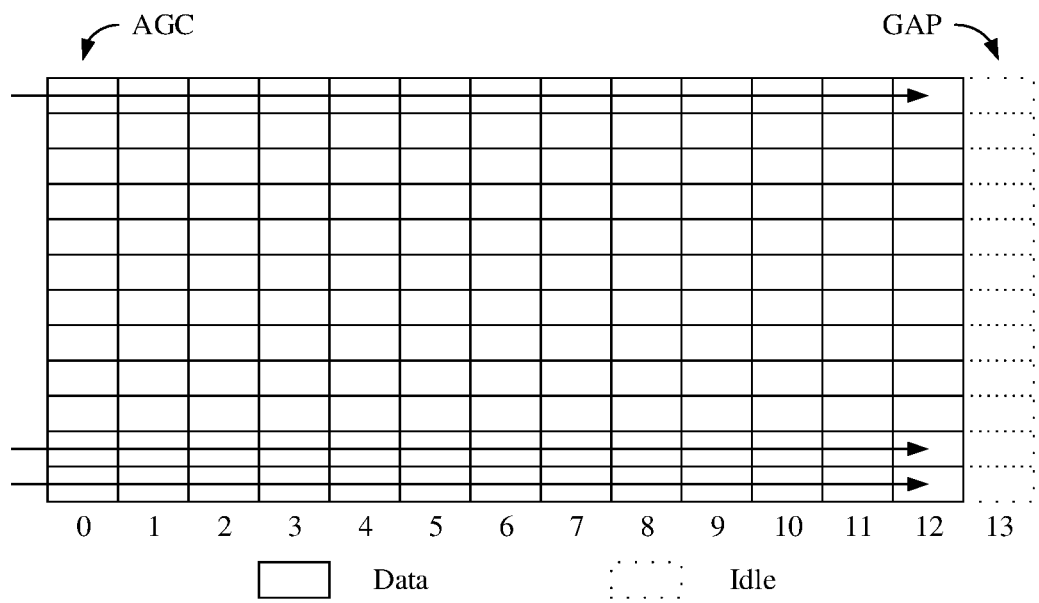
FIG. 1 is a schematic diagram of a time domain first and frequency domain second mapping mode.

The following describes technical solutions of this application with reference to accompanying drawings.

The technical solutions in the embodiments of this application may be applied to various communications systems, for example, a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, an internet of vehicles communications system, a 5th generation (5G) mobile communications system, or a future communications system such as a 6G system.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompany drawings. In addition, a combination of these solutions may be used.

In addition, in the embodiments of this application, the terms such as "for example" and "such as" are used to represent giving an example, an illustration, or a description. Any embodiment or design scheme described as an "example" in this application should not be explained as being more preferred or having more advantages than another embodiment or design scheme. Exactly, use of the term "example" is intended to describe a concept in a specific way.

In the embodiments of this application, the terms "information", "signal", "message", "channel", and "signaling" may be interchangeably used sometimes. It should be noted that meanings expressed by the terms are consistent when differences between the terms are not emphasized. The terms "of", "corresponding (relevant)", and "corresponding" may be interchangeably used sometimes. It should be noted that meanings expressed by the terms are consistent when differences between the terms are not emphasized.

In the embodiments of this application, sometimes a subscript such as $W_1$ may be written in an incorrect form such as W1. Expressed meanings are consistent when differences between them are not emphasized.

A network architecture and a service scenario that are described in the embodiments of this application are intended to describe the technical solutions in the embodiments of this application more clearly, and do not constitute a limitation on the technical solutions provided in the embodiments of this application. A person of ordinary skill in the art may know that with evolution of the network architecture and emergence of a new service scenario, the technical solutions provided in the embodiments of this application are also applicable to similar technical problems.

Figure 2:
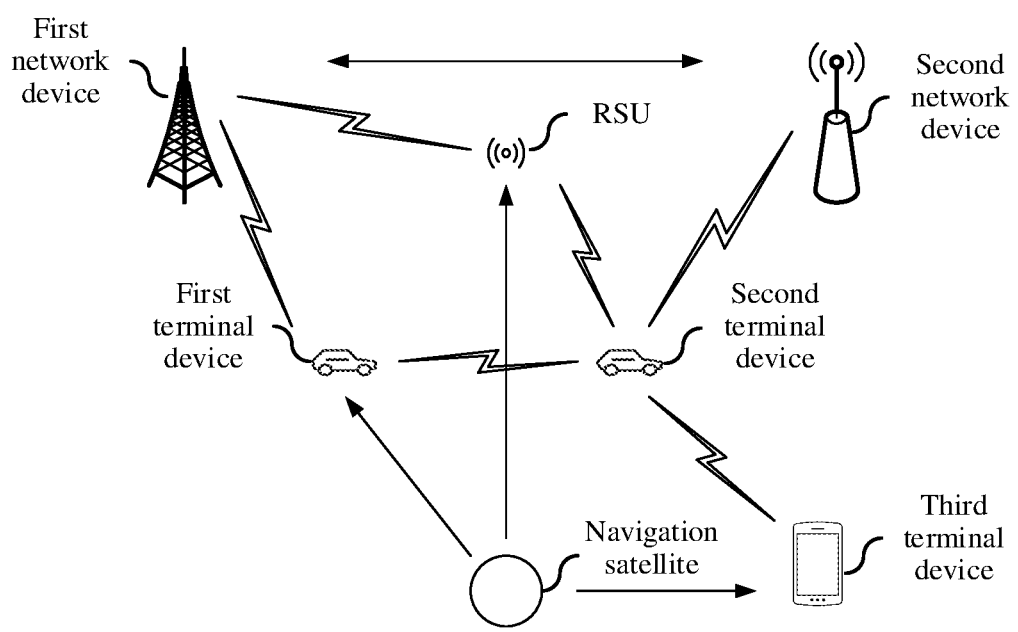
FIG. 2 is a schematic architectural diagram of a communications system according to an embodiment of this application.

In the embodiments of this application, some scenarios are described by using, as an example, a scenario in an internet of vehicles communications system shown in FIG. 2. It should be noted that the solutions in the embodiments of this application may also be applied to another mobile communications system, and a corresponding name may also be replaced with a name of a corresponding function in the another mobile communications system.

For ease of understanding the embodiments of this application, a communications system applicable to the embodiments of this application is first described in detail by using the internet of vehicles communications system in FIG. 2 as an example.

As shown in FIG. 2, the internet of vehicles communications system includes one or more terminal devices, one or more road side units (RSU), one or more network devices, and one or more global navigation satellite systems (GNSS).

The terminal device may be a vehicle-mounted terminal, for example, a first terminal device or a second terminal device in FIG. 2. Terminal devices may directly communicate with each other through a sidelink (SL), or may indirectly communicate with each other by using a wireless network. The RSU may communicate with each vehicle-mounted device and/or eNB. The network device may be a base station, for example, an evolved NodeB (evolved Node B, eNB) in a long term evolution (LTE) system, or a g node (g Node B, gNB) in a new radio (NR) system, and may communicate with each vehicle-mounted terminal and/or RSU. The GNSS may provide timing information and position information for the foregoing devices, such as the terminal device and the RSU. The foregoing devices may communicate with each other. During communication, a spectrum of a cellular link may be used, or an intelligent transportation spectrum near 5.9 giga hertz (GHz) may be used. The devices may communicate with each other based on an LTE technology or a device-to-device (D2D) communications technology such as a V2X technology.

It should be noted that the terminal device may alternatively be a terminal device such as a mobile phone or a Pad used by a pedestrian, an RSU having a terminal function, or the like. This is not limited in the embodiments of this application.

In addition, optionally, the terminal device may alternatively be a network device, for example, a base station, an eNB, a gNB, or an RSU, and may communicate with each vehicle-mounted terminal and/or RSU or another network device. This is not limited in the embodiments of this application.

In addition, the network device is optional. For example, if there is a base station, there is a scenario with network coverage. If there is no base station, there is a scenario without network coverage.

In the embodiments of this application, the network device is a device that is located on a network side of the internet of vehicles communications system and that has a wireless transceiver function, or a chip that can be disposed in the device. The network device includes but is not limited to an evolved NodeB (evolved Node B, eNB), a radio network controller (RNC), a NodeB (Node B, NB), a base station controller (BSC), a base transceiver station (BTS), a home base station (for example, a home evolved NodeB, or a home Node B, HNB), a baseband unit (BBU), an access point (AP) in a wireless fidelity (WIFI) system, a wireless relay node, a wireless backhaul node, a transmission point (transmission and reception point, TRP, or transmission point, TP), or the like. Alternatively, the network device may be a gNB or a transmission point (TRP or TP) in a 5G system such as a new radio (NR) system, or one antenna panel or a group of antenna panels (including a plurality of antenna panels) of a base station in a 5G system, or may be a network node, such as a baseband unit (BBU) or a distributed unit (DU), that constitutes a gNB or a transmission point.

The terminal device is a terminal that accesses the internet of vehicles communications system and that has the wireless transceiver function, or a chip that can be disposed in the terminal. The terminal device may also be referred to as a user apparatus, an access terminal, a subscriber unit, a subscriber station, a mobile station, a mobile console, a remote station, a remote terminal, a mobile device, a user terminal, a terminal, a wireless communications device, a user agent or a user apparatus. The terminal device in the embodiments of this application may be a mobile phone, a tablet computer, a computer having the wireless transceiver function, a virtual reality (VR) terminal device, an augmented reality (AR) terminal device, a wireless terminal in industrial control, a wireless terminal in self driving, a wireless terminal in telemedicine (also called remote medical), a wireless terminal in a smart grid, a wireless terminal in transportation safety, a wireless terminal in a smart city, a wireless terminal in a smart home, or the like.

It should be understood that FIG. 2 is only a simplified schematic diagram that is used as an example for ease of understanding. The communications system may further include another network device and/or terminal device that are or is not shown in FIG. 2.

Figure 3:
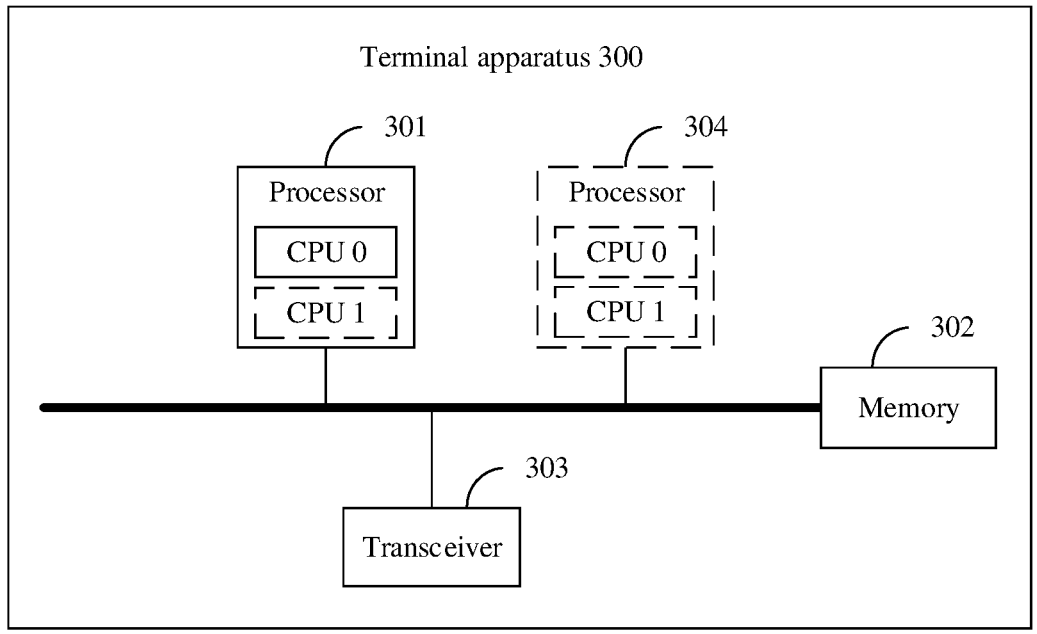
FIG. 3 is a first schematic structural diagram of a terminal apparatus according to an embodiment of this application.

A communication method provided in the embodiments of this application may be applied to a terminal apparatus shown in FIG. 3. The terminal apparatus may be a network device or a terminal device, or may be a chip applied to a network device or a terminal, or another component having a function of the network device or the terminal. As shown in FIG. 3, the terminal apparatus may include at least one processor 301, a memory 302, and a transceiver 303.

The following describes the components of the terminal apparatus in detail with reference to FIG. 3.

The processor 301 is a control center of the terminal apparatus, and may be one processor, or may be a collective name of a plurality of processing elements. For example, the processor 301 may be a central processing unit (CPU), or an application specific integrated circuit (ASIC), or may be configured as one or more integrated circuits implementing the embodiments of this application, for example, one or more microprocessors (for example, digital signal processor, DSP), or one or more field programmable gate arrays (FPGA).

The processor 301 may run or execute a software program stored in the memory 302, and invoke data stored in the memory 302, to perform various functions of the terminal apparatus.

In specific implementation, in an embodiment, the processor 301 may include one or more CPUs, for example, a CPU 0 and a CPU 1 that are shown in FIG. 3.

In specific implementation, in an embodiment, the terminal apparatus may include a plurality of processors, for example, the processor 301 and a processor 304 that are shown in FIG. 3. Each of the processors may be a single-core processor (single-CPU) or may be a multi-core processor (multi-CPU). The processor herein may be one or more communications devices, circuits, and/or processing cores configured to process data (for example, a computer program instruction).

The memory 302 may be a read-only memory (ROM) or another type of static storage device that can store static information and instructions, or a random access memory (RAM) or another type of dynamic storage communications device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage communications device, or any other medium that can be used to carry or store expected program code in a form of an instruction or a data structure and that can be accessed by a computer. However, the memory 302 is not limited thereto. The memory 302 may exist independently, or may be integrated with the processor 301.

The memory 302 is configured to store a software program for performing the solutions of this application, and the processor 301 controls execution of the software program.

The transceiver 303 is configured to communicate with another terminal apparatus. Certainly, the transceiver 303 may further be configured to communicate with a communications network, such as the Ethernet, a radio access network (RAN), or a wireless local area network (WLAN). The transceiver 303 may include a receiving unit for implementing a receiving function and a sending unit for implementing a sending function.

In this embodiment of this application, the memory 302 may store the software program or an instruction. After the terminal apparatus 300 is powered on, the processor 301 may read the software program or the instruction from the memory 302, and execute the software program or the instruction, so that the terminal apparatus 300 can perform a communication method shown in one or more of FIG. 4, FIG. 7, or FIG. 14. For example, the processor 301 may perform the following S401 and S402, or perform S701 and S702, or perform S1401 and S1402. For another example, the processor 301 may also control the transceiver 303 to perform any one of the following S403, S703, or S1403. For the foregoing specific implementations, refer to the following method embodiments. Details are not described herein.

A structure of the terminal apparatus shown in FIG. 3 does not constitute a limitation on the terminal apparatus. The terminal apparatus may include more or fewer components than those shown in the figure, or combine some components, or have a different component arrangement.

The terminal apparatus 300 may also be sometimes referred to as a communications apparatus or a communications device, and may be a general-purpose device or a special-purpose device. For example, the terminal apparatus 300 may be a vehicle-mounted terminal, an RSU, a personal digital assistant (PDA), a mobile phone, a tablet computer, a wireless terminal device, an embedded device, the foregoing terminal device, the foregoing network device, or a device having a structure similar to the structure shown in FIG. 3. A type of the terminal apparatus 300 is not limited in this embodiment of this application.

The following describes in detail a communication method provided in the embodiments of this application with reference to FIG. 4 to FIG. 20.

Figure 4:
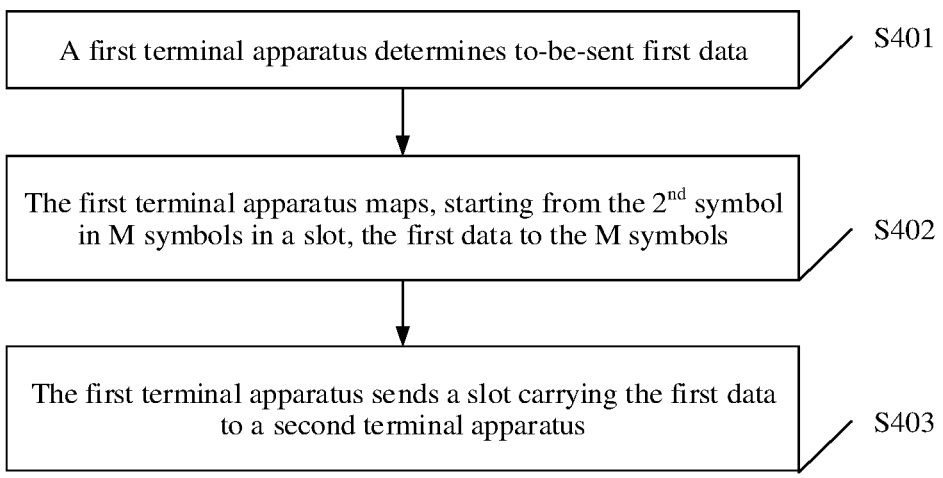
FIG. 4 is a schematic flowchart of a communication method according to an embodiment of this application.

FIG. 4 is a schematic flowchart of a communication method according to an embodiment of this application. The communication method may be applied to any terminal device, any network device, or the RSU in FIG. 2. As shown in FIG. 4, the communication method includes the following steps.

S401: A first terminal apparatus determines to-be-sent first data.

The first data includes at least one transmission block. For example, the first data may be V2X service data. For example, the first data may be navigation information, video information, or voice information of a vehicle-mounted terminal. A type of the first data is not limited in this embodiment of this application.

S402: The first terminal apparatus maps, starting from the $2^{nd}$ symbol in M symbols in a slot, the first data to the M symbols.

The M symbols are M consecutive symbols in the slot. For example, the M symbols may be consecutive symbols that are available for sending sidelink (SL) data in the slot. A sidelink is a link used for direct communication between two or more terminals, for example, a radio link between two vehicle-mounted terminals in the internet of vehicles, or a link between two network devices.

In a possible design method, that the first terminal apparatus maps, starting from the $2^{nd}$ symbol in the M symbols in the slot, the first data to the M symbols may include the following step:

The first terminal apparatus maps, starting from the $2^{nd}$ symbol in the M symbols, the first data to symbols that are from the $2^{nd}$ symbol to the last symbol in the M symbols. In other words, the first data is directly mapped to all other M-1 symbols than the $1^{st}$ symbol.

Further, data mapped to the $1^{st}$ symbol in the M symbols may be data mapped to a first symbol. The first symbol may be any one of symbols that are from the $2^{nd}$ symbol to the last symbol in the M symbols. In other words, the $1^{st}$ symbol in the M symbols may be generated by "duplicating" a symbol to which the first data is mapped.

Figure 5:
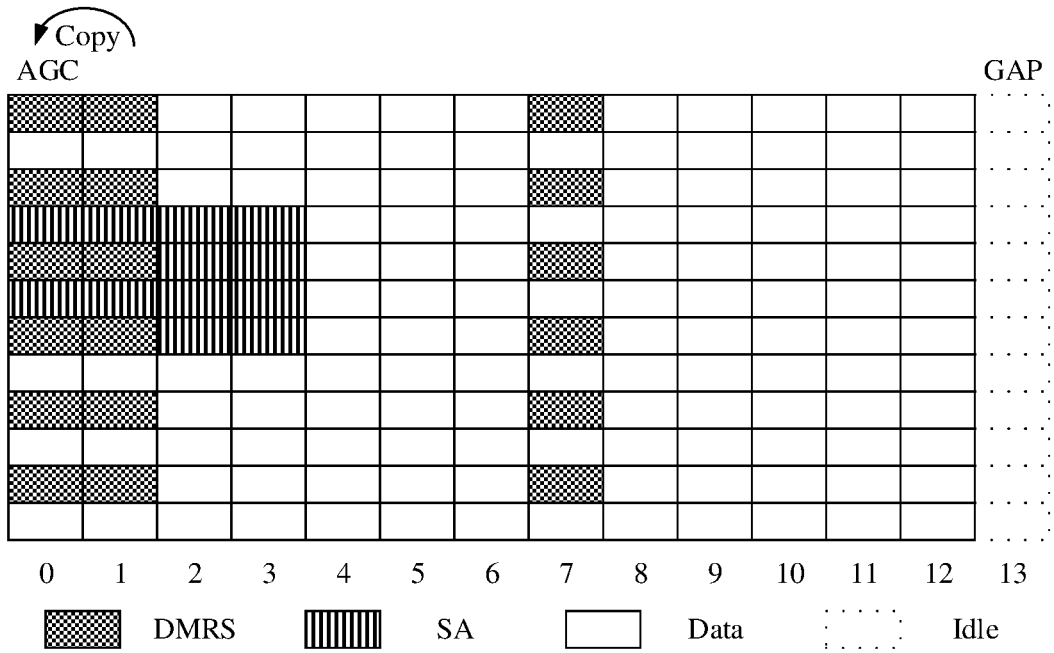
FIG. 5 is a first schematic diagram of a method for generating an AGC symbol according to an embodiment of this application.
Figure 6:
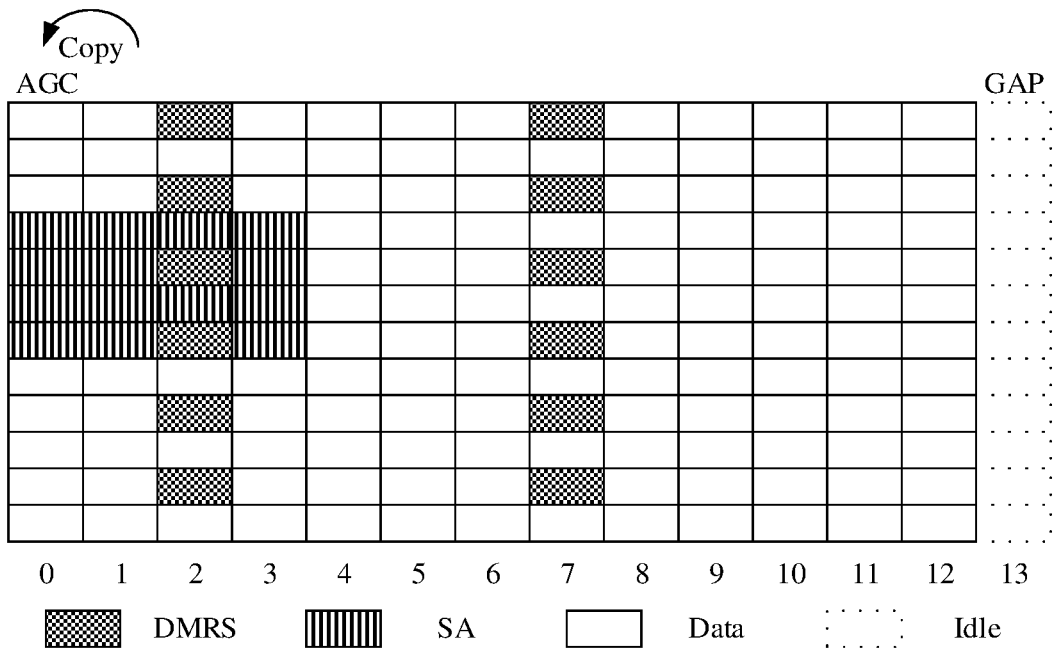
FIG. 6 is a second schematic diagram of a method for generating an AGC symbol according to an embodiment of this application.

For example, as shown in FIG. 5 or FIG. 6, the M symbols include symbol 0 to symbol 12 in the slot. First, the first data is mapped to symbol 1 to the symbol 12. Then, the first data that is mapped to the symbol 1 is "copied" to the symbol 0. It should be noted that the "duplicating" operation cannot cover an RE that is originally used to carry a common control/reporting signal such as a reference signal, a synchronization signal, a scheduling assignment (SA) signal, or a feedback signal (such as ACK/NACK) and that is on the $1^{st}$ symbol in the M symbols. The "duplicating" operation is using, as mapped data on the symbol 0, the first data that is mapped to the symbol 1.

In this embodiment of this application, the $1^{st}$ symbol in the M symbols is usually used for an automatic gain control (AGC) procedure of a second terminal apparatus. In AGC, the second terminal apparatus collects statistics on gains, for example, receive power and signal strength, of one or more symbols that are located in the front in time domain, adjusts a gain of a subsequent symbol based on the collected receive power and signal strength, and then performs demodulation and decoding, to improve demodulation and decoding performance. Because both the data mapped to the $1^{st}$ symbol in the M symbols and another symbol in the M symbols carry the first data, a signal similarity is relatively high. Therefore, the second terminal apparatus demodulates and decodes, based on a gain result obtained through statistics on the $1^{st}$ symbol in the M symbols, the first data carried on the another symbol in the M symbols. This can further improve a demodulation and decoding success rate, to further improve the demodulation and decoding performance of the second terminal apparatus in a scenario in which a wireless channel changes drastically.

It is easy to understand that the $1^{st}$ symbol in the M symbols may also be generated in another way in addition to a way of performing the foregoing "duplicating" operation. For example, a random number may be placed on an RE of the $1^{st}$ symbol.

In this application, the M symbols may be all or partial symbols in the slot. This is not limited in this embodiment of this application. When the M symbols are the partial symbols, the M symbols may start with the $1^{st}$ symbol in the slot, or may start with any symbol after the first symbol in the slot, for example, the $5^{th}$ symbol. Likewise, when the M symbols are the partial symbols, the M symbols may end with the last symbol in the slot, or may end with any symbol located before the last symbol in the slot, for example, a penultimate symbol. For example, one slot includes 14 symbols numbered from 0 to 13. The M symbols may start with symbol 0 and end with symbol 13, or may start with symbol 5 and end with symbol 13, or may start with symbol 0 and end with symbol 8, or may start with symbol 7 and end with symbol 13. Specific positions of the M symbols in the slot are not limited in this embodiment of this application.

For example, the last symbol in the M symbols may be the last symbol in the slot or the penultimate symbol in the slot.

For example, the $1^{st}$ symbol in the M symbols may be any one of the $1^{st}$ symbol, the $2^{nd}$ symbol, the $3^{rd}$ symbol, or the $4^{th}$ symbol in the slot.

It may be understood that when the M symbols are the partial symbols in the slot, a symbol other than the M symbols in the slot may be allocated to another user, or may be idle. This is not limited in this application.

The $1^{st}$ symbol in the M symbols may alternatively be determined based on a subcarrier spacing. To avoid signal distortion caused by a drastic change of the wireless channel, a larger subcarrier spacing usually needs to be configured. In other words, poorer quality of the wireless channel leads to a larger subcarrier spacing that needs to be configured. Correspondingly, the second terminal apparatus also needs to use more symbols to complete automatic gain control, to implement more accurate gain statistics and control, and further improve the demodulation and decoding performance.

Optionally, when a subcarrier spacing corresponding to the slot is 15 kilohertz (kilohertz, kHz) or 30 kHz, the $1^{st}$ symbol in the M symbols may be the $1^{st}$ symbol or the $2^{nd}$ symbol in the slot.

Optionally, when the subcarrier spacing corresponding to the slot is 60 kHz or 120 kHz, the $1^{st}$ symbol in the M symbols may be the 3rd symbol or the 4th symbol in the slot.

In a possible design method, that the first terminal apparatus determines the to-be-sent first data may include the following steps.

Step 1: The first terminal apparatus determines a scaling factor based on a first parameter.

The first parameter includes at least one of a size of the first data, a quantity of time-frequency resources that are in the M symbols and that can be used to send the first data, or a modulation and coding scheme to be used to send the first data.

The size of the first data is a value of a data amount of the first data. The time-frequency resource may include a time domain resource and a frequency domain resource. For example, in time domain, the time-frequency resource may be one or more configured slots, one or more configured symbols, or the like. The slot may be a full slot, or may be a short slot (also referred to as a mini slot, mini slot). For another example, in frequency domain, the time-frequency resource may be configured frequency domain bandwidth, a configured quantity of resource blocks (RB), a configured quantity of sub-bands, a configured quantity of band width parts (BWP, also referred to as a bandwidth part), or the like. The modulation and coding scheme (MCS, also referred to as a modulation and coding scheme) may usually include a modulation order, a bit rate, and the like.

Optionally, when the first terminal apparatus determines that sending resources are not reduced, the scaling factor may be 1, in other words, scaling is not performed. Optionally, when the first terminal apparatus determines that the sending resources are reduced, the scaling factor is usually less than 1.

Step 2: The first terminal apparatus determines, based on the scaling factor, a size of a transmission block included in the first data.

For example, the first terminal apparatus determines, based on the scaling factor, the size (transmission block size, TBS) of the transmission block carrying the first data. It should be noted that, in this embodiment of this application, some symbols may be reserved for the second terminal apparatus to perform automatic gain control, and a total quantity of available resources may be less than a total quantity of resources in a normal case. Therefore, the determined scaling factor is usually less than 1. In other words, in this embodiment of this application, fewer information bits carried by the M symbols lead to a smaller transmission block of the first data sent on the M symbols.

Step 3: The first terminal apparatus determines, based on the size of the transmission block, a quantity of transmission blocks included in the first data.

It is easy to understand that, because the size of the transmission block is smaller, the first data may be divided into more transmission blocks, and more time-frequency resources are required to send the first data.

In addition, the slot may be a single slot, or may be one of a plurality of consecutive slots used to send the first data. This is not limited herein. Optionally, when the slot is one of the plurality of consecutive slots, the first terminal apparatus further needs to determine the scaling factor based on a second parameter. The second parameter includes at least one of the following parameters: a quantity of the consecutive slots used to send the first data, a number of the slot in the consecutive slots used to send the first data, or the subcarrier spacing of the slot.

When a quantity of available time-frequency resources on the M symbols, for example, the available time-frequency resources, is greater than or less than a resource requirement of the first data, rate matching or puncturing further needs to be performed on the M symbols. Therefore, optionally, the communication method may further include the following step:

The first terminal apparatus performs, on the M symbols, rate matching or puncturing on the first data.

Optionally, one or more symbols located foremost in the M symbols in time domain are usually used by the second terminal apparatus to perform automatic gain control. For example, the $1^{st}$ symbol in the M symbols is used by the second terminal apparatus to perform automatic gain control. Alternatively, the $1^{st}$ and the $2^{nd}$ symbols in the M symbols are used by the second terminal apparatus to perform automatic gain control. Alternatively, the $1^{st}$ to the $4^{th}$ symbols in the M symbols are used by the second terminal apparatus to perform automatic gain control. It should be noted that, when a plurality of symbols in the M symbols are used by the second terminal apparatus to perform automatic gain control, some symbols at rear positions in the plurality of symbols may also be used to carry data, to improve resource utilization and a throughput. For example, the M symbols include 14 consecutive symbols numbered from 0 to 13. The first four symbols, in other words, symbols 0 to 3, are used by the second terminal apparatus to perform AGC. One or more symbols in symbols 2 and 3 may also be used to carry data that needs to be demodulated and decoded by the second terminal apparatus.

S403: The first terminal apparatus sends the slot carrying the first data to the second terminal apparatus.

For example, the first terminal apparatus may send the slot carrying the first data to the second terminal apparatus over the sidelink.

It should be noted that rate matching or puncturing may be performed according to a preset rule known to both the first terminal apparatus and the second terminal apparatus, or may be independently determined by the first terminal apparatus based on a channel status fed back by the second terminal apparatus and an automatic gain control capability of the second terminal apparatus. It is easy to understand that, if the rate matching operation or the puncturing operation is performed according to a unique preset rule, the first terminal apparatus does not need to notify the second terminal apparatus. However, if the first terminal apparatus independently selects a rule from a plurality of preset rules, and performs the rate matching operation or the puncturing operation according to the selected rule, or the first terminal apparatus independently determines the rate matching operation or the puncturing operation based on the channel status fed back by the second terminal apparatus and the automatic gain control capability of the second terminal apparatus, the first terminal apparatus further needs to notify the second terminal apparatus of an operation performed by the first terminal apparatus. Therefore, optionally, the first terminal apparatus sends first indication information. The first indication information is used to indicate that the first terminal apparatus performs rate matching or puncturing on the first data.

According to the communication method provided in this embodiment of this application, the first terminal apparatus can reserve some symbols at front positions in the slot in a process of mapping the first data to the M symbols. In this way, the second terminal apparatus can perform automatic gain control based on the reserved symbols in the scenario in which the wireless channel changes rapidly, to reduce a bit error rate and improve receiving performance.

Figure 7:
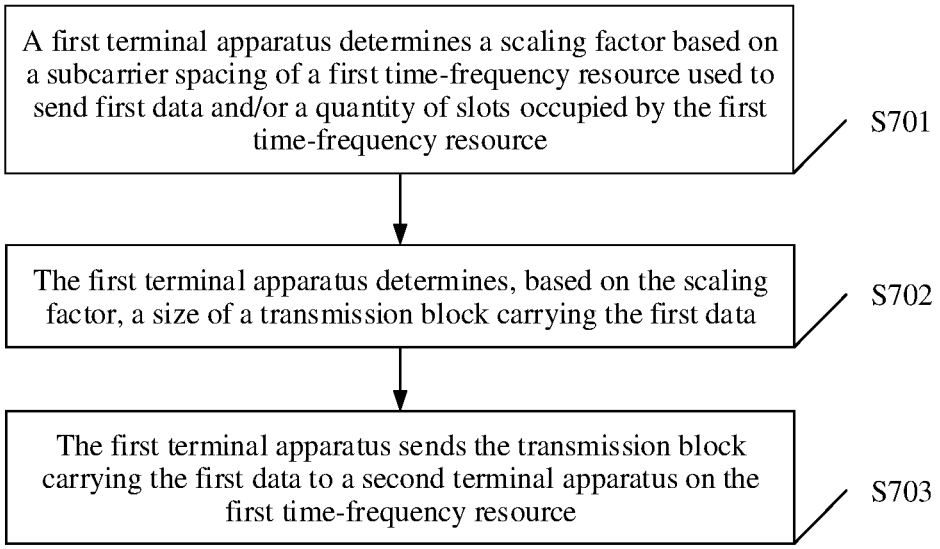
FIG. 7 is a schematic flowchart of another communication method according to an embodiment of this application.

FIG. 7 is a schematic flowchart of another communication method according to an embodiment of this application. The communication method may be applied to any terminal device, any network device, or the RSU in FIG. 2. As shown in FIG. 7, the communication method includes the following steps.

S701: A first terminal apparatus determines a scaling factor based on a subcarrier spacing of a first time-frequency resource to be used to send first data and/or a quantity of slots occupied by the first time-frequency resource.

The first data is to-be-sent data of the first terminal apparatus, and the first time-frequency resource occupies a single slot or a plurality of consecutive slots.

Optionally, when the first terminal apparatus determines that sending resources are not reduced, the scaling factor may be 1, in other words, scaling is not performed. Optionally, when the first terminal apparatus determines that the sending resources are reduced, the scaling factor is usually less than 1.

In a possible design method, the first time-frequency resource may occupy the single slot. Correspondingly, the foregoing S701 in which the first terminal apparatus determines the scaling factor based on the subcarrier spacing of the first time-frequency resource to be used to send the first data and/or the quantity of slots occupied by the first time-frequency resource may include the following step: The first terminal apparatus determines a quantity of feature symbols in the single slot based on the subcarrier spacing. Then, the first terminal apparatus determines the scaling factor based on the quantity of feature symbols in the single slot.

The subcarrier spacing is positively correlated with the quantity of feature symbols in the single slot.

Figure 8:
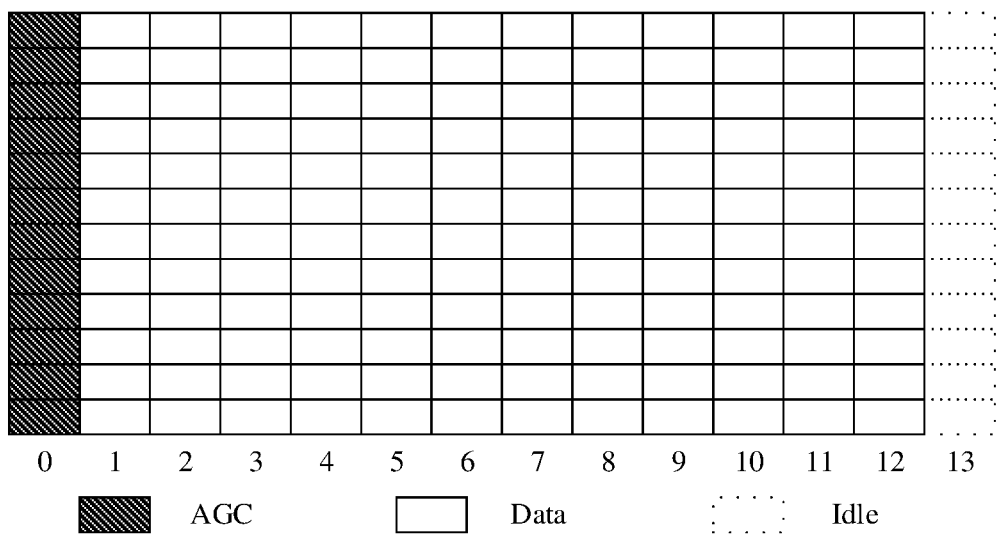
FIG. 8 is a first schematic diagram of a pattern for mapping an AGC symbol according to an embodiment of this application.
Figure 9:
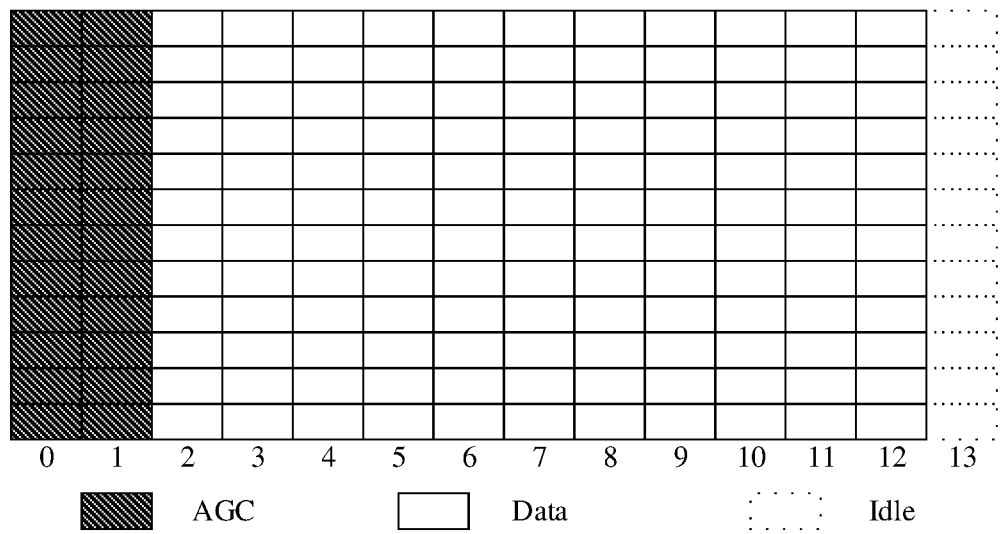
FIG. 9 is a second schematic diagram of a pattern for mapping an AGC symbol according to an embodiment of this application.
Figure 10:
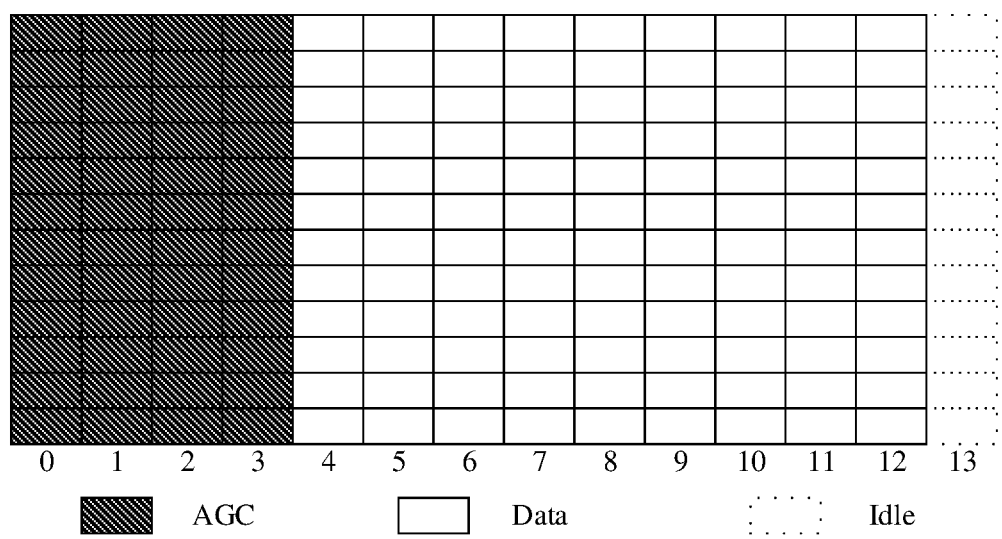
FIG. 10 is a third schematic diagram of a pattern for mapping an AGC symbol according to an embodiment of this application.

FIG. 8 to FIG. 10 respectively show feature symbol patterns of the single slot in different subcarrier spacing conditions. For example, that the subcarrier spacing is positively correlated with the quantity of feature symbols in the single slot may include: The subcarrier spacing is 15 kHz, and the quantity of feature symbols in the single slot is 2. Alternatively, the subcarrier spacing is 30 kHz or 60 kHz, and the quantity of feature symbols in the single slot is 2 or 3. Alternatively, the subcarrier spacing is 120 kHz or 240 kHz, and the quantity of feature symbols in the single slot is 3 or 5. As shown in FIG. 8, the single slot usually includes one symbol used for automatic gain control performed by a second terminal apparatus and one null symbol (GAP symbol). As shown in FIG. 9, the single slot usually includes two symbols used for automatic gain control performed by the second terminal apparatus and one null symbol (GAP symbol). As shown in FIG. 10, the single slot usually includes four symbols used for automatic gain control performed by the second terminal apparatus and one null symbol (GAP symbol).

It should be noted that different symbols in the foregoing feature symbols may be inconsecutive. For example, the subcarrier spacing is 15 kHz, and the quantity of feature symbols in the single slot is 2. A symbol used for automatic gain control performed by the second terminal apparatus is usually located at a start position of the single slot, in other words, symbol 0. The other symbol is a null symbol and may be used in a scenario such as transceiving switching or radio frequency circuit switching. The other symbol is usually located at an end position of the single slot, in other words, the last symbol 0f the single slot.

Further, that the first terminal apparatus determines the scaling factor based on the quantity of feature symbols in the single slot may include: The first terminal apparatus determines the scaling factor based on a quantity of symbols other than the feature symbol in the single slot. In other words, the first terminal apparatus determines the scaling factor based on a symbol other than all feature symbols in the single slot.

It should be noted that the first terminal apparatus may also transmit valid data by using some feature symbols. For example, when two or more symbols in the single slot are used for automatic gain control performed by the second terminal apparatus, the valid data may be mapped to a symbol at a rear position in the symbols used for automatic gain control performed by the second terminal apparatus. The valid data is data that needs to be demodulated and decoded by the second terminal apparatus.

In another possible design method, the first time-frequency resource may alternatively occupy the plurality of consecutive slots. Correspondingly, that the first terminal apparatus determines the scaling factor based on the subcarrier spacing of the first time-frequency resource to be used to send the first data and/or the quantity of slots occupied by the first time-frequency resource may include: The first terminal apparatus determines a quantity of feature symbols in each slot in the plurality of consecutive slots based on the subcarrier spacing and a quantity of the plurality of consecutive slots. Then, the first terminal apparatus determines, based on the quantity of feature symbols in each slot in the plurality of consecutive slots, a scaling factor corresponding to the slot in the plurality of consecutive slots. The subcarrier spacing is positively correlated with the quantity of feature symbols in each slot in the plurality of consecutive slots.

Figure 11:
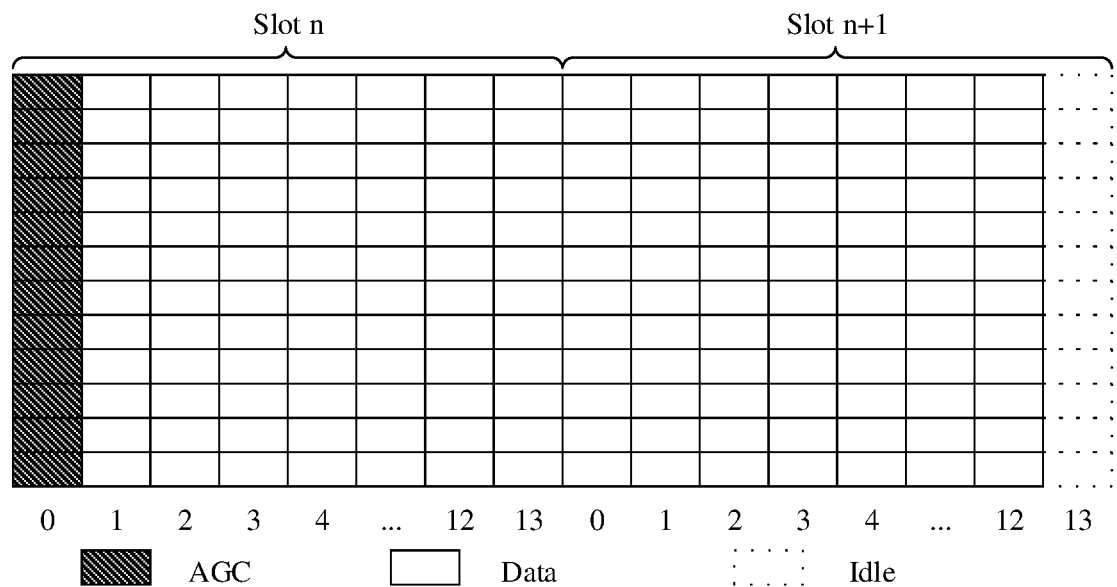
FIG. 11 is a fourth schematic diagram of a pattern for mapping an AGC symbol according to an embodiment of this application.
Figure 12:
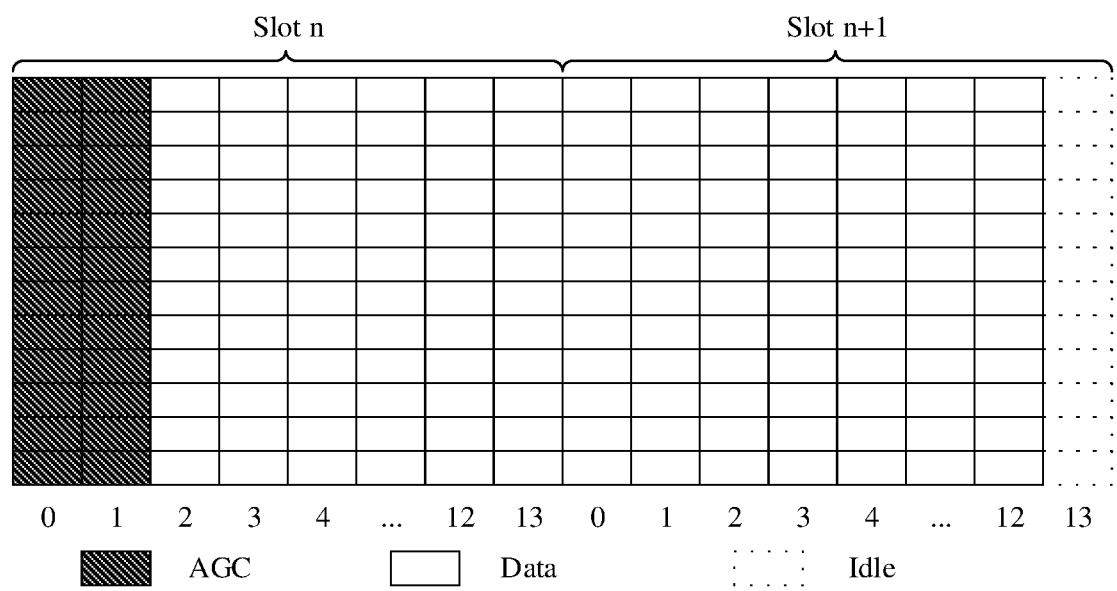
FIG. 12 is a fifth schematic diagram of a pattern for mapping an AGC symbol according to an embodiment of this application.
Figure 13:
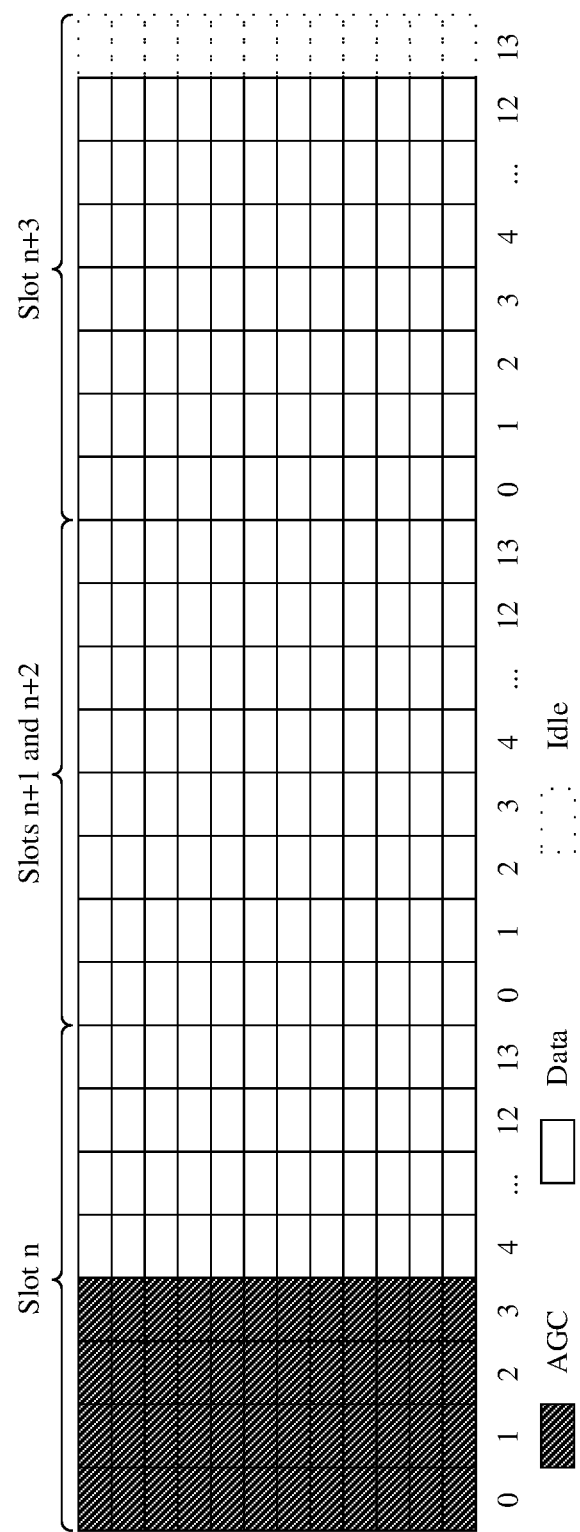
FIG. 13 is a sixth schematic diagram of a pattern for mapping an AGC symbol according to an embodiment of this application.

FIG. 11 to FIG. 13 respectively show feature symbol patterns of a plurality of consecutive slots of different quantities in different subcarrier spacing conditions. "A plurality of" means two or more. In a scenario of the plurality of consecutive slots, quantities of feature symbols included in different slots in the plurality of consecutive slots may be the same or different.

For example, for the $1^{st}$ slot in the plurality of consecutive slots, that the subcarrier spacing is positively correlated with the quantity of feature symbols in each slot in the plurality of consecutive slots may include: The subcarrier spacing is 15 kHz, and a quantity of feature symbols in the $1^{st}$ slot in the plurality of consecutive slots is 1, for example, symbol 0 in a slot n in FIG. 11. Alternatively, the subcarrier spacing is 30 kHz or 60 kHz, and a quantity of feature symbols in the $1^{st}$ slot in the plurality of consecutive slots is 1, for example, symbol 0 in a slot n in FIG. 11, or is 2, for example, symbol 0 and symbol 1 in a slot n in FIG. 12. Alternatively, the subcarrier spacing is 120 kHz or 240 kHz, and a quantity of feature symbols in the $1^{st}$ slot in the plurality of consecutive slots is 2, for example, symbol 0 and symbol 1 in a slot n in FIG. 12, or may be 4, for example, symbol 0 to symbol 3 in a slot n in FIG. 13.

It should be noted that the last slot in the plurality of consecutive slots may relate to transceiving switching or radio frequency circuit switching. In this case, only one symbol is required. Therefore, a quantity of feature symbols in the last slot in the plurality of consecutive slots may be determined not based on the subcarrier spacing. Instead, the last symbol in the last slot is directly configured as the null symbol, for example, symbol 13 in a slot n+1 in FIG. 11, symbol 13 in a slot n+1 in FIG. 12, or symbol 13 in a slot n+3 in FIG. 13.

In addition, no feature symbol may be usually configured for a slot other than the $1^{st}$ and the last slots in the plurality of consecutive slots, in other words, an intermediate slot. When performing demodulation and decoding on the intermediate slot, the second terminal apparatus may complete an automatic gain control operation on the intermediate slot based on a gain statistics result of the $1^{st}$ slot. This can save resources, carry more data, and improve a data throughput.

It should be noted that, based on a time correlation of a different wireless channel condition, a different quantity or length (which may be referred to as an automatic gain control period or step) of a plurality of consecutive slots that can share the gain statistics result of the $1^{st}$ slot may be set, for example, may be 2, 4, 6, or 8 slots. Specifically, a poorer wireless channel condition leads to a shorter automatic gain control period. On the contrary, a better wireless channel condition leads to a longer automatic gain control period.

In addition, if a wireless channel condition is poor and changes drastically, one or more symbols located foremost in each slot in the plurality of consecutive slots may be configured as a symbol used by the second terminal apparatus to perform automatic gain control. For a specific implementation, refer to related descriptions in the foregoing scenario of the single slot. Details are not described herein again. It is easy to understand that, different from the single slot, the null symbol may still include only the last symbol in the last slot.

It is easy to understand that, because quantities of available time-frequency resources in different slots in the plurality of consecutive slots are different, scaling factors corresponding to the different slots also need to be adjusted accordingly. For example, a symbol to be used to perform automatic gain control needs to be reserved in the $1^{st}$ slot in the plurality of consecutive slots, and the last symbol in the last slot is the null symbol. Therefore, optionally, a scaling factor corresponding to the $1^{st}$ slot in the plurality of consecutive slots is different from a scaling factor corresponding to the last slot in the plurality of consecutive slots.

Actually, the plurality of consecutive slots may further include the intermediate slot. The intermediate slot is any slot other than the $1^{st}$ and the last slots in the plurality of consecutive slots. Therefore, optionally, a scaling factor corresponding to the intermediate slot is different from the scaling factor corresponding to the $1^{st}$ slot; and/or a scaling factor corresponding to the intermediate slot is different from the scaling factor corresponding to the last slot.

Optionally, the scaling factor corresponding to the intermediate slot may be 1, in other words, scaling is not performed.

Optionally, the scaling factor corresponding to the $1^{st}$ slot and the scaling factor corresponding to the last slot are less than 1.

Optionally, the scaling factor corresponding to the $1^{st}$ slot is less than or equal to the factor corresponding to the last slot.

It is easy to understand that the plurality of consecutive slots may include a plurality of intermediate slots. Therefore, further, scaling factors corresponding to the plurality of intermediate slots are the same.

It should be noted that two slots corresponding to different scaling factors in the plurality of consecutive slots may carry transmission blocks of different sizes, to maximally improve resource utilization and the data throughput. It is easy to understand that two slots corresponding to a same scaling factor in the plurality of consecutive slots may carry transmission blocks of a same size, so that a same modulation and coding scheme can be used to a greatest extent. This simplifies data sending and receiving processes, and improves processing efficiency.

For example, in the plurality of consecutive slots, a redundancy version of the first data sent in the $1^{st}$ slot is different from a redundancy version of the first data sent in the last slot; and/or a redundancy version of the first data sent in the $1^{st}$ slot is different from a redundancy version of the first data sent in any one of the intermediate slots; and/or a redundancy version of the first data sent in the last slot is different from a redundancy version of the first data sent in any one of the intermediate slots; and/or redundancy versions of the first data sent in different slots in the plurality of intermediate slots are the same. The sent first data has different redundancy versions, and this can maximally use a resource and avoid a waste. The redundancy versions of the first data sent in the plurality of intermediate slots are the same, and this can reduce complexity of a modulation and coding operation.

When a channel status is relatively poor, a same transmission block of the first data may alternatively be repeatedly sent in each slot in the plurality of consecutive slots, to improve a data transmission success rate. In this case, scaling factors corresponding to different slots in the plurality of consecutive slots are the same. It is easy to understand that a same scaling factor applicable to each slot may be determined based on a quantity of available resources in any one of the plurality of consecutive slots. Therefore, the communication method shown in FIG. 7 may further include: The first terminal apparatus determines, based on a quantity of feature symbols in a first slot in the plurality of consecutive slots, the scaling factor applicable to each slot in the plurality of consecutive slots. The first slot is any slot in the plurality of consecutive slots.

Optionally, the first slot may be the $1^{st}$ slot in the plurality of consecutive slots. Because there are fewer available resources in the $1^{st}$ slot, the determined scaling factor is relatively small. Therefore, a data carrying capability of the $1^{st}$ slot may be less than a data carrying capability of any other slot. Therefore, correspondingly, the communication method shown in FIG. 7 may further include: The first terminal apparatus performs a rate matching operation on a transmission block in one or more slots other than the first slot in the plurality of consecutive slots. For example, a lower bit rate may be used in another slot, to improve a demodulation and decoding success rate of the second terminal apparatus.

It should be noted that, as shown in FIG. 11, when there is one feature symbol in the $1^{st}$ slot in the plurality of consecutive slots, a quantity of available resources in the $1^{st}$ slot may be the same as a quantity of available resources in the last slot. In this case, a same modulation and coding scheme may be used for the $1^{st}$ slot and the last slot. For example, a same bit rate is used to perform channel coding.

Optionally, the first slot may alternatively be the last slot in the plurality of consecutive slots. The quantity of available resources in the last slot is usually greater than the quantity of available resources in the $1^{st}$ slot and less than a quantity of available resources in the intermediate slot. Correspondingly, the communication method shown in FIG. 7 may further include one or more of the following operations: The first terminal apparatus punctures the transmission block in the $1^{st}$ slot in the plurality of consecutive slots; and/or the first terminal apparatus performs rate matching on the transmission block in any slot other than the $1^{st}$ and the last slots in the plurality of consecutive slots.

Optionally, the first slot may alternatively be any slot other than the $1^{st}$ and the last slots in the plurality of consecutive slots, namely, the intermediate slot. Correspondingly, the communication method shown in FIG. 7 may further include: The first terminal apparatus punctures the transmission block in the $1^{st}$ slot and/or the last slot in the plurality of consecutive slots.

For example, the feature symbol may include at least one of the following symbols: the symbol to be used to perform automatic gain control, the null symbol, a symbol used to determine the scaling factor, or a symbol to which the first data is not directly mapped, for example, the $1^{st}$ symbol generated by using the duplicating method.

In the foregoing possible implementations, the quantity of feature symbols is first determined based on the subcarrier spacing, and then the scaling factor is determined. Actually, the scaling factor corresponding to the single slot or each of the plurality of consecutive slots or the scaling factor corresponding to the plurality of consecutive slots may alternatively be determined directly based on the subcarrier spacing, without considering the feature symbol.

For example, when a wireless channel status is extremely poor, all of the plurality of consecutive slots may alternatively be only used to send one transmission block of the first data, in other words, the transmission block is sent only once in all the slots, to reduce a bit rate and improve the demodulation and decoding success rate. Therefore, in a possible implementation, that the first terminal apparatus determines the scaling factor based on the subcarrier spacing of the first time-frequency resource to be used to send the first data and/or the quantity of slots occupied by the first time-frequency resource may include: The first terminal apparatus determines, based on the subcarrier spacing and a quantity of the plurality of consecutive slots, the scaling factor corresponding to the plurality of consecutive slots. The scaling factor corresponding to the plurality of consecutive slots is used to map a same transmission block of the first data to the plurality of consecutive slots in a scattered mode, and only some bits of the transmission block are mapped to each slot.

In another possible implementation, that the first terminal apparatus determines the scaling factor based on the subcarrier spacing of the first time-frequency resource to be used to send the first data and/or the quantity of slots occupied by the first time-frequency resource may include the following steps:

For example, as shown in FIG. 8, when the subcarrier spacing is 15 kHz or 30 kHz, the first terminal apparatus determines the scaling factor based on a symbol other than the $1^{st}$ and the last symbols in the single slot.

Alternatively, as shown in FIG. 9, when the subcarrier spacing is 30 kHz, 60 kHz, or 120 kHz, the first terminal apparatus determines the scaling factor based on a symbol other than the $1^{st}$, the $2^{nd}$, and the last symbols in the single slot.

Alternatively, as shown in FIG. 10, when the subcarrier spacing is 120 kHz or 240 kHz, the first terminal apparatus determines the scaling factor based on a symbol other than the $1^{st}$ to the $4^{th}$ and the last symbols in the single slot.

In still another possible implementation, that the first terminal apparatus determines the scaling factor based on the subcarrier spacing of the first time-frequency resource to be used to send the first data and/or the quantity of slots occupied by the first time-frequency resource may include the following steps:

For example, as shown in FIG. 11, when the subcarrier spacing is 15 kHz or 30 kHz, the first terminal apparatus determines the scaling factor based on a symbol other than the $1^{st}$ symbol in the $1^{st}$ slot in the plurality of consecutive slots.

Alternatively, as shown in FIG. 12, when the subcarrier spacing is 30 kHz, 60 kHz, or 120 kHz, the first terminal apparatus determines the scaling factor based on a symbol other than the $1^{st}$ and the $2^{nd}$ symbols in the $1^{st}$ slot in the plurality of consecutive slots.

Alternatively, as shown in FIG. 13, when the subcarrier spacing is 120 kHz or 240 kHz, the first terminal apparatus determines the scaling factor based on a symbol other than the $1^{st}$ to the $4^{th}$ symbols in the $1^{st}$ slot in the plurality of consecutive slots.

Alternatively, as shown in FIG. 11 to FIG. 13, the first terminal apparatus determines the scaling factor based on a symbol other than the last symbol in the last slot in the plurality of consecutive slots.

S702: The first terminal apparatus determines, based on the scaling factor, a size of a transmission block carrying the first data.

Specifically, the size of the transmission block carrying the first data may be determined based on a total quantity of resources configured for the single slot or each of the plurality of consecutive slots, for example, a total quantity of configured RBs, and the scaling factor.

For example, a transmission block size corresponding to one slot may be calculated according to the following formula:

$$N_{RB}=\max\{\lfloor N'_{RB} \times P \rfloor, 1\}$$

$N_{RB}$ is a quantity that is of RBs occupied by a scaled transmission block and that is determined according to the foregoing implementations, $N'_{RB}$ is a total quantity of RBs configured by a network device such as a base station, or a total quantity that is of resource blocks of a transmission resource determined by UE, P is the scaling factor determined according to the foregoing implementations, $0<P\leq1$, the operator $\lfloor x \rfloor$ represents rounding down, and the operator $\max\{,\}$ represents taking a maximum value. P=1 indicates no scaling. For example, when a channel condition is relatively good, no symbol needs to be reserved for the second terminal apparatus to perform automatic gain control, and transceiving switching and radio frequency circuit switching do not need to be performed.

S703: The first terminal apparatus sends the transmission block carrying the first data to the second terminal apparatus on the first time-frequency resource.

For example, the first terminal apparatus may send the transmission block carrying the first data to the second terminal apparatus over a sidelink.

Optionally, the communication method shown in FIG. 7 may further include: The first terminal apparatus sends first indication information. The first indication information is used to indicate that the first terminal apparatus determines, in the single slot or a plurality of types of slots, the size of the transmission block carrying the first data based on the scaling factor. For example, the first indication information is used to indicate symbols, in the single slot or the plurality of slots, on which the second terminal apparatus performs demodulation and decoding.

Optionally, if the first terminal apparatus performs rate matching or puncturing in the single slot or a slot in the plurality of consecutive slots, the first terminal apparatus may further need to send second indication information to the second terminal apparatus. The second indication information is used to indicate the second terminal apparatus to perform, in a specific slot received by the second terminal apparatus, a reverse procedure of rate matching or puncturing performed by the first terminal apparatus.

It should be noted that, if the first terminal apparatus and the second terminal apparatus use a same preset rule to perform scaling, rate matching, or puncturing on the transmission block, in other words, the second terminal apparatus serving as a receiver can learn of details about scaling, rate matching, or puncturing performed by the first terminal apparatus on the transmission block, the first terminal apparatus may alternatively not send the first indication information or the second indication information. The same preset rule may be separately stored in the first terminal apparatus and the second terminal apparatus for use.

According to the communication method provided in this embodiment of this application, the scaling factor and the size of the transmission block of the first data can be determined based on the subcarrier spacing of the first time-frequency resource and/or the quantity of slots occupied by the first time-frequency resource, and an adjusted transmission block of the first data is sent to the second terminal apparatus on the first time-frequency resource. In other words, as the subcarrier spacing and/or a quantity of available slots change (or changes), a quantity of time-frequency resources carrying the first data also changes. The first terminal apparatus can dynamically adjust, based on the time-frequency resource change, a data amount of the first data carried in the single slot or the plurality of consecutive slots. This can avoid an error in demodulating and decoding the first data due to insufficient time-frequency resources, and improve data transmission reliability.

Figure 14:
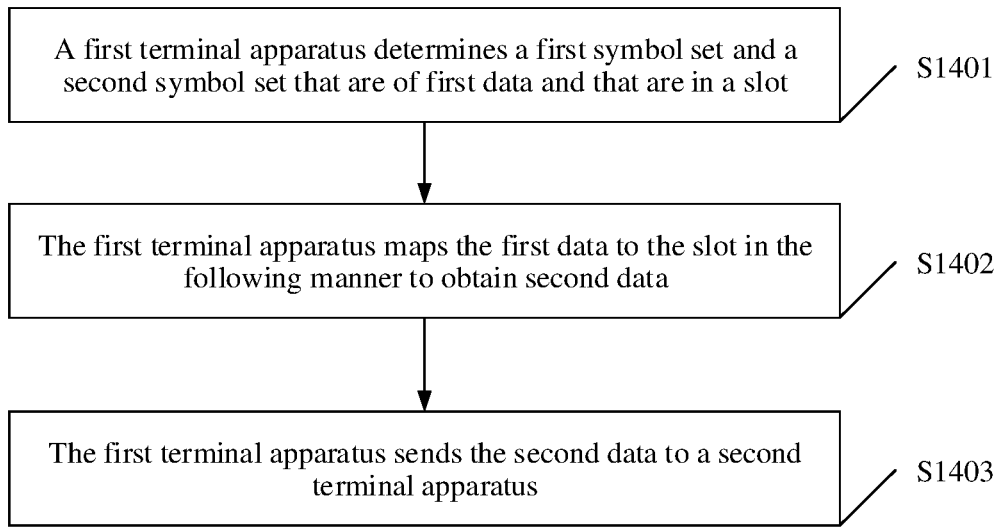
FIG. 14 is a schematic flowchart of still another communication method according to an embodiment of this application.
Figure 15:
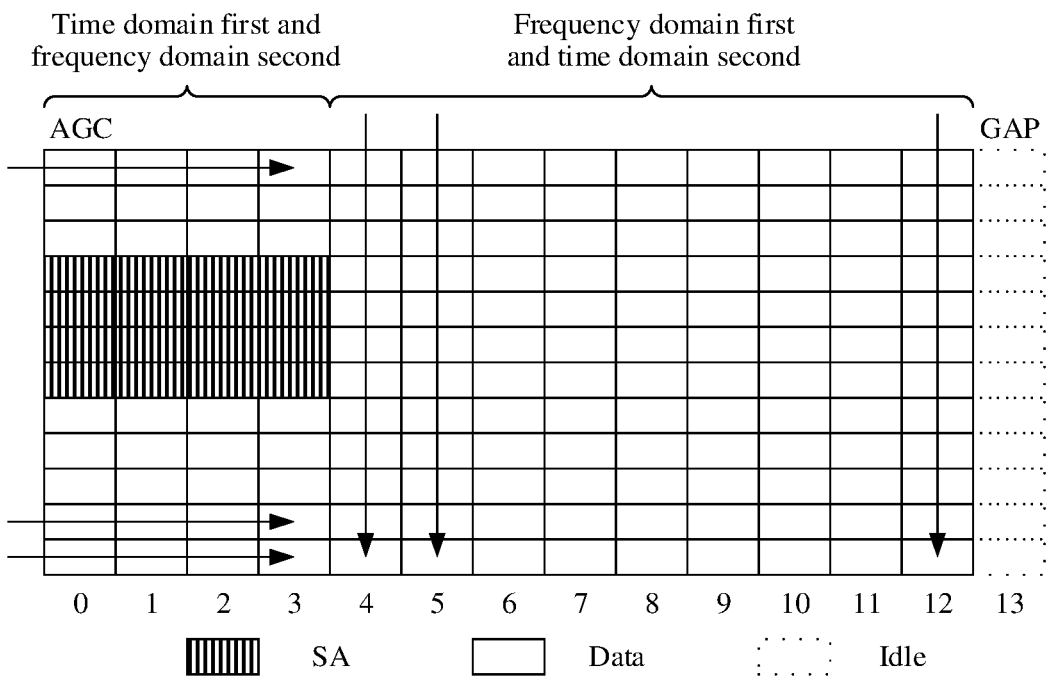
FIG. 15 is a first schematic diagram of a pattern for mapping a data symbol according to an embodiment of this application.

FIG. 14 is a schematic flowchart of still another communication method according to an embodiment of this application. The communication method may be applied to any terminal device, any network device, or the RSU in FIG. 2. As shown in FIG. 14, the communication method includes the following steps.

S1401: A first terminal apparatus determines a first symbol set and a second symbol set that are of first data and that are in a slot.

The second symbol set is located, in time domain, after the first symbol set, and the first symbol set and the second symbol set are consecutive.

For example, the first symbol set may include the 1st symbol in the slot, and one symbol or a plurality of consecutive symbols that is or are located after the 1st symbol in time domain and that is or are adjacent to the 1st symbol.

In a possible design method, that the first terminal apparatus determines the first symbol set and the second symbol set that are of the first data and that are in the slot may include the following step:

The first terminal apparatus determines, based on a symbol that is occupied by control information and that is in the slot, the first symbol set. The control information may include scheduling assignment SA information.

Optionally, the first symbol set includes the symbol occupied by the control information. For example, as shown in any one of FIG. 15 to FIG. 20, the first symbol set includes a symbol, in the slot, occupied by the SA information, for example, symbol 0 to symbol 3.

Further, the first symbol set may include one symbol or a plurality of consecutive symbols that is or are located, in time domain, after the symbol occupied by the control information and that is or are adjacent to the last symbol occupied by the control information.

Figure 16:
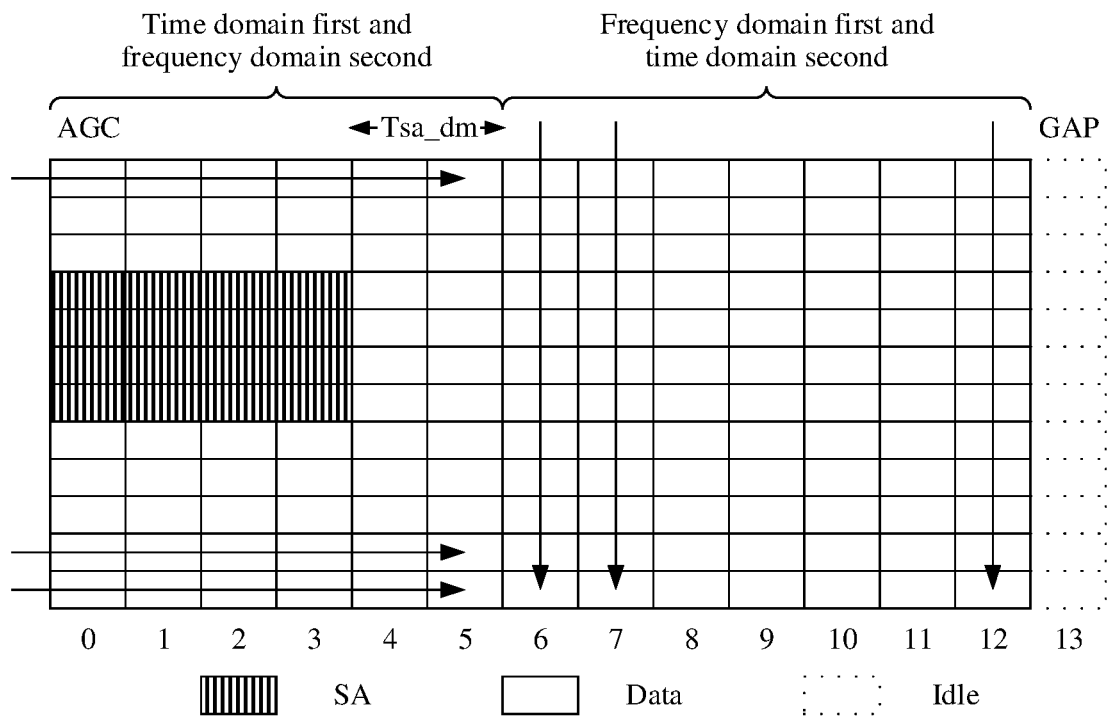
FIG. 16 is a second schematic diagram of a pattern for mapping a data symbol according to an embodiment of this application.

For example, in addition to the symbols 0 to 3 to which the SA information is mapped and that are in the slot, the first symbol set may further include a symbol that is not occupied by the SA information. For example, as shown in FIG. 16, the first symbol set may further include symbol 4 and symbol 5. The symbol 4 and the symbol 5 may be considered as reserved duration in which a second terminal apparatus demodulates and decodes the SA information carried in the symbols 0 to 3. It is easy to understand that a quantity of symbols in the first symbol set that do not carry the SA information may be determined based on a capability of the second terminal apparatus for demodulating and decoding the SA information, and may be represented by using a symbol quantity, for example, one symbol or three symbols, or may be represented by using absolute duration, for example, 100 microseconds (μs) or 200 microseconds.

Figure 17:
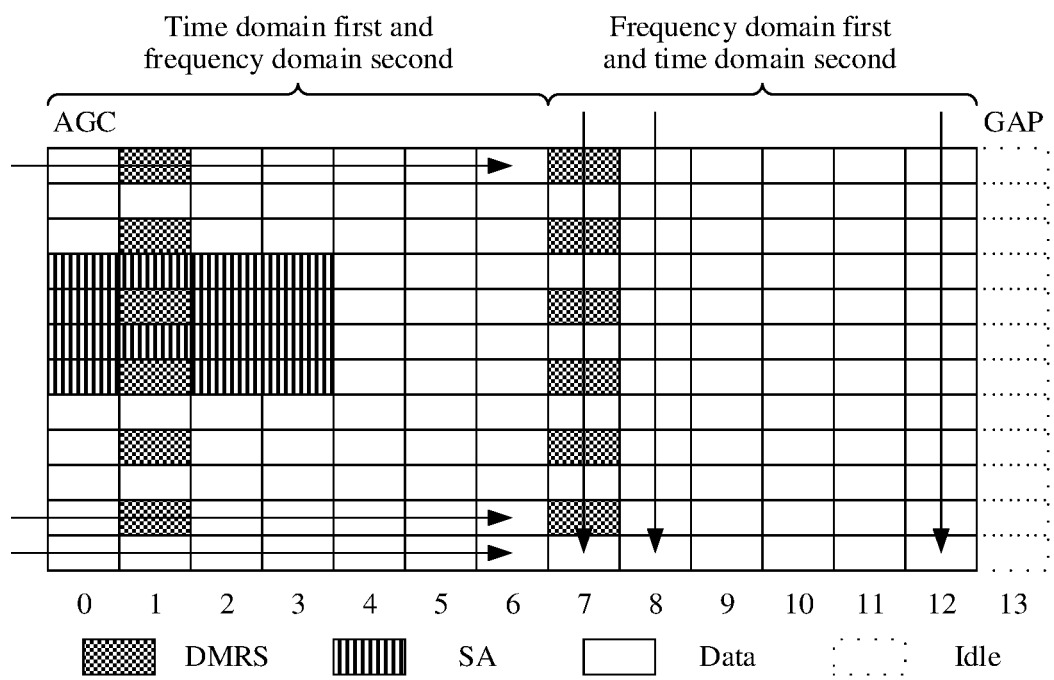
FIG. 17 is a third schematic diagram of a pattern for mapping a data symbol according to an embodiment of this application.
Figure 18:
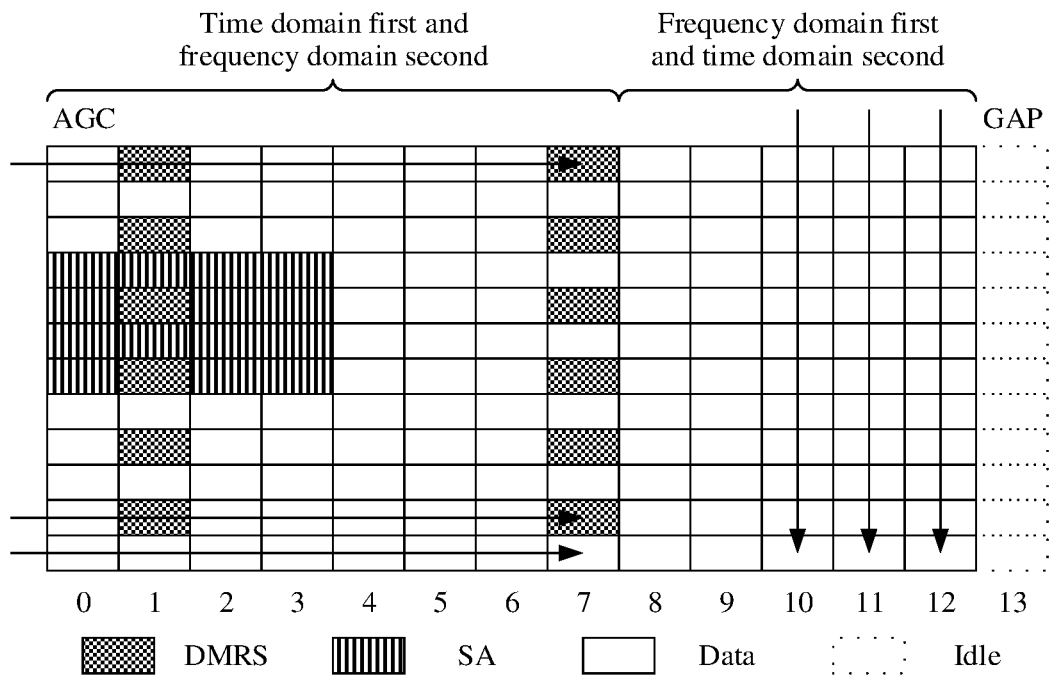
FIG. 18 is a fourth schematic diagram of a pattern for mapping a data symbol according to an embodiment of this application.
Figure 19:
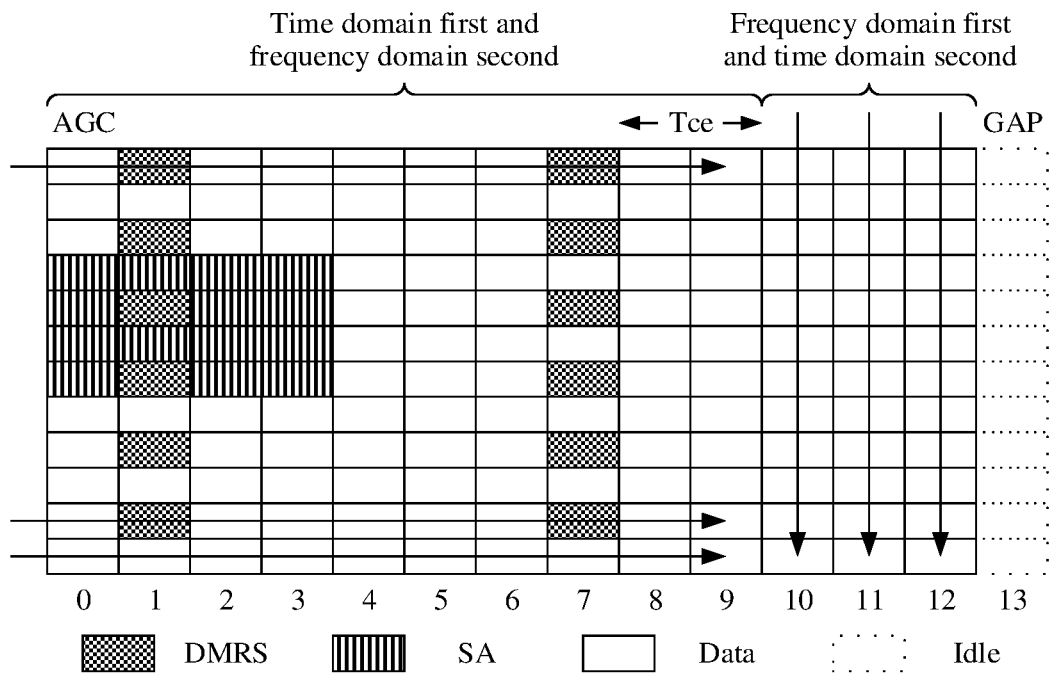
FIG. 19 is a fifth schematic diagram of a pattern for mapping a data symbol according to an embodiment of this application.
Figure 20:
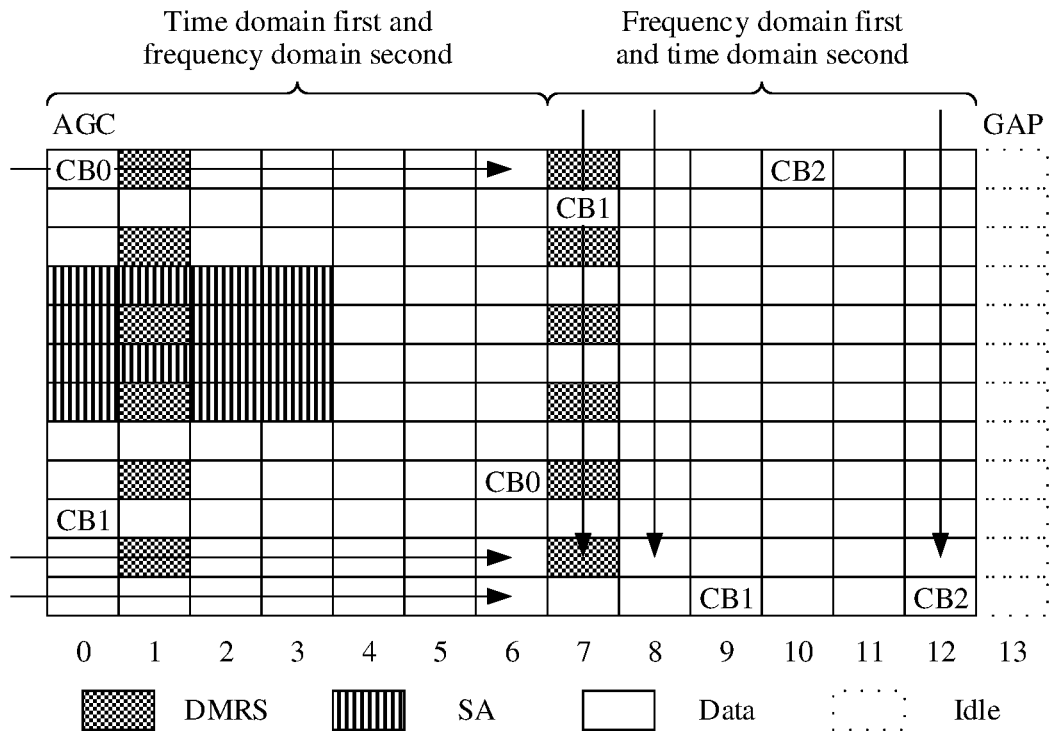
FIG. 20 is a sixth schematic diagram of a pattern for mapping a data symbol according to an embodiment of this application.

In another possible design method, that the first terminal apparatus determines the first symbol set and the second symbol set that are of the first data and that are in the slot may include: The first terminal apparatus determines, based on a symbol that is occupied by a demodulation reference signal (DMRS) and that is in the slot, the first symbol set. The first symbol set includes a symbol, in the slot, occupied by the 1st DMRS. For example, as shown in FIG. 17, FIG. 18, or FIG. 20, the 1st DMRS occupies the symbol 0. In this case, the first symbol set includes the symbol 0. For another example, as shown in FIG. 19, the 1st DMRS occupies symbol 1. In this case, the first symbol set includes the symbol 1.

Optionally, the first symbol set may further include all symbols, in the slot, located before a symbol occupied by the 2nd DMRS. For example, as shown in FIG. 17 or FIG. 20, the 2nd DMRS occupies symbol 7. In this case, the first symbol set includes the symbol 0 to symbol 6, but does not include the symbol 7.

Further, the first symbol set may include the symbol, in the slot, occupied by the 2nd DMRS. For example, as shown in FIG. 18, the 2nd DMRS occupies symbol 7. In this case, the first symbol set includes the symbol 0 to the symbol 7, but does not include a symbol located after the symbol 7.

Still further, the first symbol set includes one symbol or a plurality of consecutive symbols that is or are located, in time domain, after the symbol occupied by the 2nd DMRS and that is or are adjacent to the symbol occupied by the 2nd DMRS. For example, as shown in FIG. 19, the 2nd DMRS occupies symbol 7. In this case, the first symbol set not only includes the symbol 0 to the symbol 7, but also includes symbol 8 and symbol 9. The symbol 8 and the symbol 9 may be considered as reserved duration in which the second terminal apparatus processes the 2nd DMRS, so that the second terminal apparatus demodulates the 2nd DMRS. It is easy to understand that a quantity of other symbols that are included in the first symbol set and that are located after the symbol occupied by the 2nd DMRS may be determined based on a capability of the second terminal apparatus for demodulating the DMRS, and may be represented by using a symbol quantity, for example, one symbol or three symbols, or may be represented by using absolute duration, for example, 100 microseconds or 200 microseconds.

In still another possible design method, that the first terminal apparatus determines the first symbol set and the second symbol set that are in the slot may include the following step:

The first terminal apparatus determines, based on a total quantity of symbols included in the slot, the first symbol set. The total quantity of symbols included in the slot one-to-one corresponds to the first symbol set.

Optionally, that the first terminal apparatus determines, based on the total quantity of symbols included in the slot, the first symbol set may include the following step:

The first terminal apparatus determines, according to any one of the following formulas, a quantity of symbols included in the first symbol set:

$$N_1 = \lfloor L/2 \rfloor;$$

$$N_1 = \lceil L/2 \rceil;$$

$$N_1 = \lfloor L/2 \rfloor - K_1; \text{ or}$$

$$N_1 = \lfloor L/2 \rfloor + K_2.$$

$N_1$ is the quantity of symbols included in the first symbol set, L is the total quantity of symbols included in the slot, $K_1$ and $K_2$ are preset offsets, the operator $\lfloor \ \rfloor$ represents rounding down, and the operator $\lceil \ \rceil$ represents rounding up. The first terminal apparatus adds $N_1$ symbols located foremost in the slot in time domain to the first symbol set.

For example, one slot includes 14 symbols, in other words, L=14. It is assumed that $K_1=1$ and $K_2=2$. In this case, quantities that are of symbols included in the first symbol set and that are obtained according to the foregoing four formulas are respectively 7, 7, 6, and 9.

In a possible design method, before the first terminal apparatus determines, according to any one of the following formulas, the quantity of symbols included in the first symbol set, the communication method shown in FIG. 14 may further include the following step:

The first terminal apparatus determines that the total quantity of symbols included in the slot is greater than a first symbol quantity threshold.

For example, the first symbol quantity threshold may be a specific symbol quantity, for example, seven symbols or nine symbols, or may be a proportion of a total quantity of symbols included in one slot, for example, ½, ⅓, or ⅔ of the total quantity of symbols.

In another possible design method, before the first terminal apparatus determines, according to any one of the following formulas, the quantity of symbols included in the first symbol set, the communication method shown in FIG. 14 may further include the following step:

The first terminal apparatus determines that total duration of the slot is greater than a first duration threshold. For example, the first duration threshold may be a symbol quantity, for example, seven symbols or nine symbols, or may be specific duration, for example, 0.5 milliseconds (ms), 0.7 milliseconds, or 0.8 milliseconds. A specific form of the first duration threshold is not limited in this embodiment of this application.

Optionally, that the first terminal apparatus determines, based on the total quantity of symbols included in the slot, the first symbol set may include the following step:

If the total quantity of symbols included in the slot is less than a second symbol quantity threshold, the first terminal apparatus determines that the first symbol set includes all symbols in the slot and the second symbol set is null.

For example, the second symbol quantity threshold may be a specific symbol quantity, for example, three symbols or five symbols, or may be a proportion of a total quantity of symbols included in one slot, for example, ⅕, ⅐, or ⅓ of the total quantity of symbols.

Optionally, that the first terminal apparatus determines, based on the total quantity of symbols included in the slot, the first symbol set may include the following step:

If the total duration of the slot is less than a second duration threshold, the first terminal apparatus determines that the first symbol set includes all symbols in the slot and the second symbol set is null. For example, the second duration threshold may be a symbol quantity, for example, three symbols or five symbols, or may be specific duration, for example, 0.5 milliseconds (ms), 0.4 milliseconds, or 0.3 milliseconds. A specific form of the second duration threshold is not limited in this embodiment of this application.

In still another possible design method, before the first terminal apparatus determines the first symbol set and the second symbol set that are in the slot, the communication method shown in FIG. 14 may further include the following step:

The first terminal apparatus determines that the first symbol set includes a feature symbol.

There are one or two feature symbols located foremost in the slot in time domain, where the one or two feature symbols may be used by the second terminal apparatus to perform automatic gain control, and/or the feature symbol is the last symbol in the slot and may be used for transceiving switching or radio frequency circuit switching.

Optionally, that the first terminal apparatus determines that the first symbol set includes the feature symbol may include the following step:

The first terminal apparatus determines, based on one or more of the following items, that the first symbol set includes the feature symbol: a quantity of a plurality of consecutive slots occupied by the first data, a number of a slot for one transmission block of the first data in the plurality of consecutive slots occupied by the first data, a subcarrier spacing, a size of the first data, bandwidth of a frequency domain resource for transmitting the first data, a quantity of symbols that can be used to send the first data, a modulation and coding scheme to be used to send the first data, channel state information of a current resource or resource pool, or the like.

In a possible design method, the communication method shown in FIG. 14 may further include the following step:

The first terminal apparatus sends indication information. The indication information may be used to indicate one or more types of the following information: whether the slot includes the feature symbol, whether the first symbol set exists, whether the second symbol set exists, the quantity of symbols included in the first symbol set, a quantity of symbols included in the second symbol set, or the like.

For example, the feature symbol may include at least one of the following symbols: a symbol to be used to perform automatic gain control, a symbol used to determine to perform a scaling operation on a transmission block of the first data, a symbol used to determine to perform rate matching on a transmission block of the first data, or a symbol used to determine to puncture a transmission block of the first data.

S1402: The first terminal apparatus maps the first data to the slot in the following mode to obtain second data: mapping the first data to the first symbol set in a time domain first and frequency domain second mapping mode and mapping the first data to the second symbol set in a frequency domain first and time domain second mapping mode.

FIG. 20 shows a mapping pattern of the first data according to an embodiment of this application. For example, as shown in FIG. 20, the first symbol set includes the symbol 0 to the symbol 6, and the second symbol set includes the symbol 7 to symbol 13. The slot is used to map one transmission block of the first data, and the transmission block includes three code blocks (code block, CB): a CB 0, a CB 1, and a CB 2.

Specifically, as shown in FIG. 20, that the first data is mapped to the first symbol set in the symbol first and frequency domain RE second mapping mode may include: First, the $1^{st}$ batch of encoded bits of the CB 0 is respectively mapped to the $1^{st}$ REs in the symbol 0 to the symbol 6 in the symbol first and frequency domain RE second mapping mode. Then, the $2^{nd}$ batch of encoded bits of the CB 0 is respectively mapped to the $2^{nd}$ REs in the symbol 0 to the symbol 6 in the symbol first and frequency domain RE second mapping mode. The rest can be deduced by analogy. After all encoded bits in the CB 0 are mapped, the CB 1 is mapped. When encoded bits of the first data are mapped to all available REs on all symbols in the first symbol set, encoded bits of the first data start to be continuously mapped to the second symbol set.

It is assumed that, when mapping to the first symbol set is completed, the CB 1 still has remaining encoded bits that are not mapped. In this case, as shown in FIG. 20, that the first data is mapped to the second symbol set in the frequency domain RE first and symbol second mapping mode may include: First, the $1^{st}$ batch of encoded bits in the remaining encoded bits of the CB 1 is mapped to the $1^{st}$ to the last REs in the symbol 7 in sequence in the frequency domain RE first and symbol second mapping mode. Then, the $2^{nd}$ batch of encoded bits in the remaining encoded bits of the CB 1 is mapped to the $1^{st}$ to the last REs in symbol 8 in sequence in the frequency domain RE first and symbol second mapping mode. The rest can be deduced by analogy. After all encoded bits in the CB 1 are mapped, the CB 2 is mapped. When encoded bits of the first data are mapped to all available REs on all symbols in the second symbol set, or when all encoded bits in the last CB block such as the CB 2 are mapped, the mapping ends.

It should be noted that, in the foregoing process of mapping the encoded bits of the first data, an RE occupied by a common signal such as a reference signal, a synchronization signal, a scheduling assignment signal, or a feedback signal cannot be occupied.

S1403: The first terminal apparatus sends the second data to the second terminal apparatus.

Specifically, the first terminal apparatus may send the second data to the second terminal apparatus over a sidelink.

According to the communication method provided in this application, the first data can be mapped to the first symbol set in the slot in the time domain first and frequency domain second mapping mode, and mapped to the second symbol set in the frequency domain first and time domain second mapping mode, to generate the second data, and the second data is sent. This can avoid the following problems: When data is mapped to all symbols in a slot in the time domain first and frequency domain second mapping mode, the second terminal apparatus can start decoding only after receiving all the symbols in the slot, and as a result, a relatively large data transmission delay is caused; when data is mapped to all symbols in a slot in the frequency domain first and time domain second mapping mode, the symbols are not interleaved, and as a result, demodulation and decoding performance of the second terminal apparatus deteriorates greatly in a scenario in which a wireless channel changes drastically. In this way, actual requirements for a data transmission delay and demodulation and decoding performance can be considered, and this can improve reliability and efficiency of data transmission in the scenario in which the wireless channel changes drastically.

The communication methods provided in the embodiments of this application are described above in detail with reference to FIG. 4 to FIG. 20. Communications apparatuses provided in the embodiments of this application are described below in detail with reference to FIG. 21 to FIG. 24.

Figure 21:
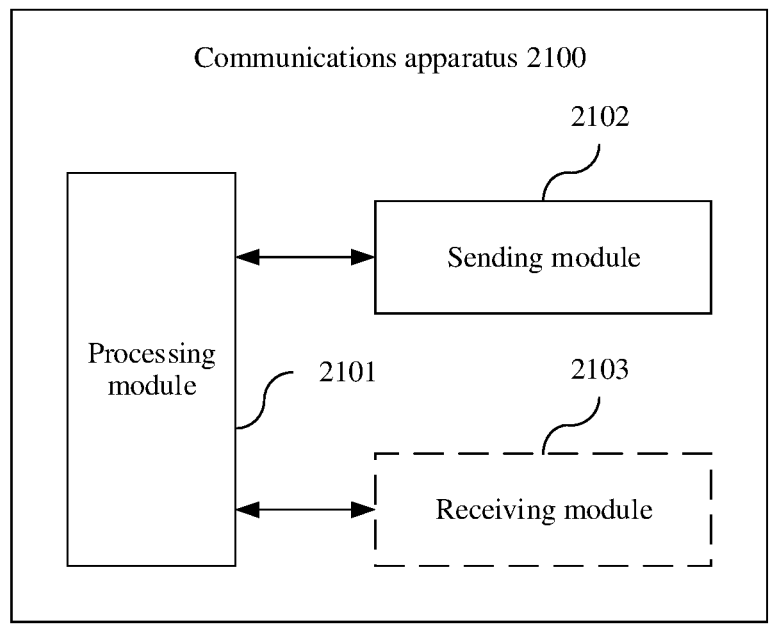
FIG. 21 is a second schematic structural diagram of a terminal apparatus according to an embodiment of this application.

FIG. 21 is a schematic structural diagram of a communications apparatus according to an embodiment of this application. The communications apparatus may be applicable to the communications system shown in FIG. 2, and perform a function of the first terminal apparatus in the communication method shown in FIG. 4. For ease of description, FIG. 21 shows only main components of the communications apparatus.

As shown in FIG. 21, the communications apparatus 2100 includes a processing module 2101 and a sending module 2102.

The communications apparatus 2100 is used as the first terminal apparatus to communicate with a second terminal apparatus. The communications apparatus 2100 includes the processing module 2101 and the sending module 2102. The processing module 2101 is configured to determine to-be-sent first data. The first data includes at least one transmission block. The processing module 2101 is further configured to map, starting from the $2^{nd}$ symbol in M symbols in a slot, the first data to the M symbols, where the M symbols are M consecutive symbols in the slot. The sending module 2102 is configured to send a slot carrying the first data to the second terminal apparatus.

For example, the M symbols may be consecutive symbols that are available for sending sidelink data in the slot.

In a possible design, the processing module 2101 is further configured to map, starting from the $2^{nd}$ symbol in the M symbols, the first data to symbols that are from the $2^{nd}$ symbol to the last symbol in the M symbols.

Further, data mapped to the $1^{st}$ symbol in the M symbols is data mapped to a first symbol. The first symbol may be any one of symbols that are from the $2^{nd}$ symbol to the last symbol in the M symbols.

For example, the last symbol in the M symbols may be the last symbol in the slot or a penultimate symbol in the slot.

For example, the $1^{st}$ symbol in the M symbols may be any one of the $1^{st}$ symbol, the $2^{nd}$ symbol, the $3^{rd}$ symbol, or the $4^{th}$ symbol in the slot.

Optionally, when a subcarrier spacing corresponding to the slot is 15 kilohertz kHz or 30 kHz, the $1^{st}$ symbol in the M symbols may be the $1^{st}$ symbol or the $2^{nd}$ symbol in the slot.

Optionally, when the subcarrier spacing corresponding to the slot is 60 kHz or 120 kHz, the $1^{st}$ symbol in the M symbols may be the 3rd symbol or the $4^{th}$ symbol in the slot.

In a possible design, the processing module 2101 is further configured to determine a scaling factor based on a first parameter. The first parameter includes at least one of a size of the first data, a quantity of time-frequency resources that are in the M symbols and that can be used to send the first data, or a modulation and coding scheme to be used to send the first data. The processing module 2101 is further configured to determine a size of a transmission block based on the scaling factor. The processing module 2101 is further configured to determine, based on the size of the transmission block, a quantity of transmission blocks included in the first data.

Optionally, the slot is one of a plurality of consecutive slots used to send the first data. Correspondingly, the processing module 2101 is further configured to determine the scaling factor based on a second parameter. The second parameter includes at least one of the following parameters: a quantity of the consecutive slots used to send the first data, a number of the slot in the consecutive slots used to send the first data, or the subcarrier spacing of the slot.

Optionally, the sending module 2102 is further configured to send first indication information to the second terminal apparatus. The first indication information is used to indicate that the first terminal apparatus performs rate matching or puncturing on the first data.

For example, the $1^{st}$ symbol in the M symbols may be used by the second terminal apparatus to perform automatic gain control. Alternatively, the $1^{st}$ and the $2^{nd}$ symbols in the M symbols may be used by the second terminal apparatus to perform automatic gain control. Alternatively, the $1^{st}$ to the $4^{th}$ symbols in the M symbols may be used by the second terminal apparatus to perform automatic gain control.

It should be noted that, optionally, the communications apparatus 2100 shown in FIG. 21 may further include a receiving module 2103, so that the communications apparatus 2100 can also perform a function performed by the second terminal apparatus in the communication method shown in FIG. 4, to implement bidirectional communication.

It should be noted that the communications apparatus 2100 may be the terminal device, the RSU, or the network device shown in FIG. 2, or may be a chip or a chip system disposed in the terminal device, the RSU, or the network device. This is not limited in this embodiment of this application.

Figure 22:
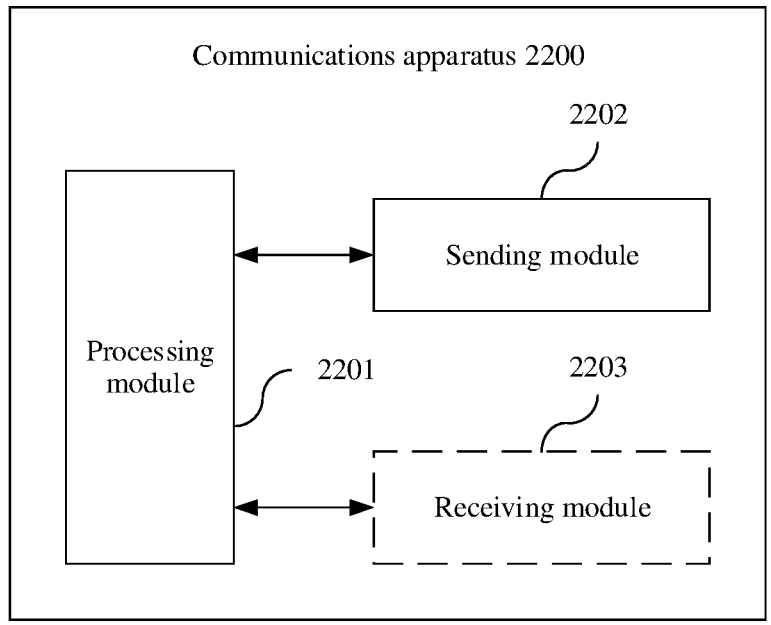
FIG. 22 is a third schematic structural diagram of a terminal apparatus according to an embodiment of this application.

FIG. 22 is a schematic structural diagram of a communications apparatus according to an embodiment of this application. The communications apparatus may be applicable to the communications system shown in FIG. 2, and perform a function of the first terminal apparatus in the communication method shown in FIG. 7. For ease of description, FIG. 22 shows only main components of the communications apparatus.

As shown in FIG. 22, the communications apparatus 2200 includes a processing module 2201 and a sending module 2202.

The processing module 2201 is configured to determine a scaling factor based on a subcarrier spacing of a first time-frequency resource to be used to send first data and/or a quantity of slots occupied by the first time-frequency resource. The first data is to-be-sent data of the first terminal apparatus, and the first time-frequency resource occupies a single slot or a plurality of consecutive slots. The processing module 2201 is further configured to determine, based on the scaling factor, a size of a transmission block carrying the first data. The sending module 2202 is configured to send the transmission block carrying the first data to a second terminal apparatus on the first time-frequency resource.

Optionally, the sending module 2202 is further configured to send first indication information. The first indication information is used to indicate that the first terminal apparatus determines, in the single slot or the plurality of consecutive slots, the size of the transmission block carrying the first data based on the scaling factor.

In a possible design, the first time-frequency resource may occupy the single slot. Correspondingly, the processing module 2201 is further configured to determine a quantity of feature symbols in the single slot based on the subcarrier spacing. The subcarrier spacing is positively correlated with the quantity of feature symbols in the single slot. The processing module 2201 is further configured to determine the scaling factor based on the quantity of feature symbols in the single slot.

For example, that the subcarrier spacing is positively correlated with the quantity of feature symbols in the single slot may include: The subcarrier spacing is 15 kHz, and the quantity of feature symbols in the single slot is 2. Alternatively, the subcarrier spacing is 30 kHz or 60 kHz, and the quantity of feature symbols in the single slot is 2 or 3. Alternatively, the subcarrier spacing is 120 kHz or 240 kHz, and the quantity of feature symbols in the single slot is 3 or 5.

Further, the processing module 2201 is further configured to determine the scaling factor based on a quantity of symbols other than the feature symbol in the single slot.

In another possible design, the first time-frequency resource may occupy the plurality of consecutive slots. Correspondingly, the processing module 2201 is further configured to determine a quantity of feature symbols in each slot in the plurality of consecutive slots based on the subcarrier spacing and a quantity of the plurality of consecutive slots. The subcarrier spacing is positively correlated with the quantity of feature symbols in each slot in the plurality of consecutive slots. The processing module 2201 is further configured to determine, based on the quantity of feature symbols in each slot in the plurality of consecutive slots, a scaling factor corresponding to the slot in the plurality of consecutive slots.

For example, that the subcarrier spacing is positively correlated with the quantity of feature symbols in each slot in the plurality of consecutive slots may include: The subcarrier spacing is 15 kHz, and a quantity of feature symbols in the $1^{st}$ slot in the plurality of consecutive slots is 1. Alternatively, the subcarrier spacing is 30 kHz or 60 kHz, and a quantity of feature symbols in the $1^{st}$ slot in the plurality of consecutive slots is 1 or 2. Alternatively, the subcarrier spacing is 120 kHz or 240 kHz, and a quantity of feature symbols in the $1^{st}$ slot in the plurality of consecutive slots is 2 or 4.

Optionally, a scaling factor corresponding to the $1^{st}$ slot in the plurality of consecutive slots is different from a scaling factor corresponding to the last slot in the plurality of consecutive slots.

Optionally, the plurality of consecutive slots may further include an intermediate slot. The intermediate slot may be any slot other than the $1^{st}$ and the last slots in the plurality of consecutive slots. Correspondingly, a scaling factor corresponding to the intermediate slot is different from the scaling factor corresponding to the $1^{st}$ slot; and/or a scaling factor corresponding to the intermediate slot is different from the scaling factor corresponding to the last slot.

It is easy to understand that the plurality of consecutive slots may include a plurality of intermediate slots. Correspondingly, scaling factors corresponding to the plurality of intermediate slots are the same.

Further, a redundancy version of the first data sent in the $1^{st}$ slot is different from a redundancy version of the first data sent in the last slot; and/or a redundancy version of the first data sent in the $1^{st}$ slot is different from a redundancy version of the first data sent in any one of the intermediate slots; and/or a redundancy version of the first data sent in the last slot is different from a redundancy version of the first data sent in any one of the intermediate slots; and/or redundancy versions of the first data sent in different slots in the intermediate slots are the same.

Optionally, the processing module 2201 is further configured to: after the first terminal apparatus determines the quantity of feature symbols in each slot in the plurality of consecutive slots based on the subcarrier spacing and the quantity of the plurality of consecutive slots, determine, based on a quantity of feature symbols in a first slot in the plurality of consecutive slots, a scaling factor applicable to each slot in the plurality of consecutive slots. The first slot may be any slot in the plurality of consecutive slots.

Optionally, the first slot may be the $1^{st}$ slot in the plurality of consecutive slots. Correspondingly, the processing module 2201 is further configured to perform rate matching on the transmission block in one or more slots other than the first slot in the plurality of consecutive slots.

Optionally, the first slot may be the last slot in the plurality of consecutive slots. Correspondingly, the processing module 2201 is further configured to puncture the transmission block in the $1^{st}$ slot in the plurality of consecutive slots; and/or the processing module 2201 is further configured to perform rate matching on the transmission block in any slot other than the $1^{st}$ and the last slots in the plurality of consecutive slots.

Optionally, the first slot may be any slot other than the $1^{st}$ and the last slots in the plurality of consecutive slots. Correspondingly, the processing module 2201 is further configured to puncture the transmission block in the $1^{st}$ slot and/or the last slot in the plurality of consecutive slots.

For example, the feature symbol may include at least one of the following symbols: a symbol to be used to perform automatic gain control, a null symbol, a symbol used to determine the scaling factor, or a symbol to which the first data is not directly mapped.

In a possible implementation, all of the plurality of consecutive slots are only used to send one transmission block of the first data. Correspondingly, the processing module 2201 is further configured to determine, based on the subcarrier spacing and a quantity of the plurality of consecutive slots, one scaling factor corresponding to the plurality of consecutive slots.

In another possible implementation, the first time-frequency resource may occupy the single slot. Correspondingly, the processing module 2201 is further configured to: when the subcarrier spacing is 15 kHz or 30 kHz, determine the scaling factor based on a symbol other than the $1^{st}$ and the last symbols in the single slot. Alternatively, the processing module 2201 is further configured to: when the subcarrier spacing is 30 kHz, 60 kHz, or 120 kHz, determine the scaling factor based on a symbol other than the $1^{st}$, the $2^{nd}$, and the last symbols in the single slot. Alternatively, the processing module 2201 is further configured to: when the subcarrier spacing is 120 kHz or 240 kHz, determine the scaling factor based on a symbol other than the $1^{st}$ to the $4^{th}$ and the last symbols in the single slot.

In still another possible implementation, the first time-frequency resource may occupy the plurality of consecutive slots. Correspondingly, the processing module 2201 is further configured to: when the subcarrier spacing is 15 kHz or 30 kHz, determine the scaling factor based on a symbol other than the $1^{st}$ symbol in the $1^{st}$ slot in the plurality of consecutive slots. Alternatively, the processing module 2201 is further configured to: when the subcarrier spacing is 30 kHz, 60 kHz, or 120 kHz, determine the scaling factor based on a symbol other than the $1^{st}$ and the $2^{nd}$ symbols in the $1^{st}$ slot in the plurality of consecutive slots. Alternatively, the processing module 2201 is further configured to: when the subcarrier spacing is 120 kHz or 240 kHz, determine the scaling factor based on a symbol other than the $1^{st}$ to the $4^{th}$ symbols in the $1^{st}$ slot in the plurality of consecutive slots. Alternatively, the processing module 2201 is further configured to determine the scaling factor based on a symbol other than the last symbol in the last slot in the plurality of consecutive slots.

It should be noted that, optionally, the communications apparatus 2200 shown in FIG. 22 may further include a receiving module 2203, so that the communications apparatus 2200 can also perform a function performed by the second terminal apparatus in the communication method shown in FIG. 7, to implement bidirectional communication.

It should be noted that the communications apparatus 2200 may be the terminal device, the RSU, or the network device shown in FIG. 2, or may be a chip or a chip system disposed in the terminal device, the RSU, or the network device. This is not limited in this embodiment of this application.

Figure 23:
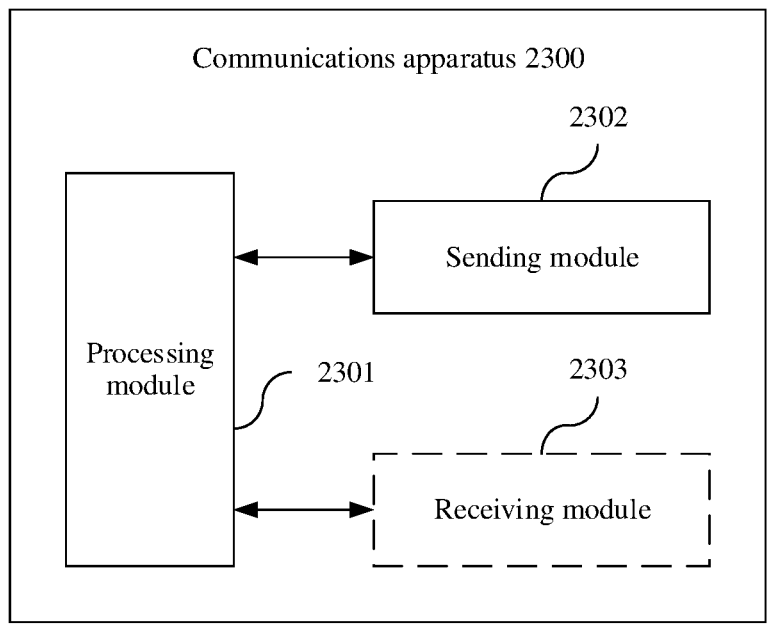
FIG. 23 is a fourth schematic structural diagram of a terminal apparatus according to an embodiment of this application.

FIG. 23 is a schematic structural diagram of another communications apparatus according to an embodiment of this application. The communications apparatus may be applicable to the communications system shown in FIG. 2, and perform a function of the first terminal apparatus in the communication method shown in FIG. 14. For ease of description, FIG. 23 shows only main components of the communications apparatus.

As shown in FIG. 23, the communications apparatus 2300 includes a processing module 2301 and a sending module 2302.

The processing module 2301 is configured to determine a first symbol set and a second symbol set that are of first data and that are in a slot. The second symbol set is located, in time domain, after the first symbol set, and the first symbol set and the second symbol set are consecutive. The processing module 2301 is further configured to map the first data to the slot in the following mode to obtain second data: mapping the first data to the first symbol set in a time domain first and frequency domain second mapping mode and mapping the first data to the second symbol set in a frequency domain first and time domain second mapping mode. The sending module 2302 is configured to send a transmission block carrying the first data.

For example, the first symbol set may include the $1^{st}$ symbol in the slot, and one symbol or a plurality of consecutive symbols that are located after the $1^{st}$ symbol in time domain and that are adjacent to the $1^{st}$ symbol.

In a possible design, the processing module 2301 is further configured to determine, based on a symbol that is occupied by control information and that is in the slot, the first symbol set.

Optionally, the first symbol set may include the symbol occupied by the control information.

Further, the first symbol set may include one symbol or a plurality of consecutive symbols that is or are located, in time domain, after the symbol occupied by the control information and that is or are adjacent to the last symbol occupied by the control information.

In another possible design, the processing module 2301 is further configured to determine, based on a symbol that is occupied by a demodulation reference signal DMRS and that is in the slot, the first symbol set. The first symbol set may include a symbol, in the slot, occupied by the $1^{st}$ DMRS.

Optionally, the first symbol set may include all symbols, in the slot, located before a symbol occupied by the $2^{nd}$ DMRS.

Further, the first symbol set may include the symbol, in the slot, occupied by the $2^{nd}$ DMRS.

Still further, the first symbol set may include one symbol or a plurality of consecutive symbols that is or are located, in time domain, after the symbol occupied by the $2^{nd}$ DMRS and that is or are adjacent to the symbol occupied by the $2^{nd}$ DMRS.

In still another possible design, the processing module 2301 is further configured to determine, based on a total quantity of symbols included in the slot, the first symbol set.

The total quantity of symbols included in the slot one-to-one corresponds to the first symbol set.

Optionally, the processing module 2301 is further configured to determine, according to any one of the following formulas, a quantity of symbols included in the first symbol set: $N_1 = \lfloor L/2 \rfloor$, $N_1 = \lceil L/2 \rceil$, $N_1 = \lfloor L/2 \rfloor - K_1$, or $N_1 = \lfloor L/2 \rfloor + K_2$. $N_1$ is the quantity of symbols included in the first symbol set, L is the total quantity of symbols included in the slot, $K_1$ and $K_2$ are preset offsets, the operator $\lfloor\ \rfloor$ represents rounding down, and the operator $\lceil\ \rceil$ represents rounding up. The first terminal apparatus adds $N_1$ symbols located foremost in the slot in time domain to the first symbol set.

In a possible design, the processing module 2301 is further configured to: before the first terminal apparatus determines, according to any one of the following formulas, the quantity of symbols included in the first symbol set, determine that the total quantity of symbols included in the slot is greater than a first symbol quantity threshold.

Optionally, the processing module 2301 is further configured to: if the total quantity of symbols included in the slot is less than a second symbol quantity threshold, determine that the first symbol set includes all symbols in the slot and the second symbol set is null.

In another possible design, the processing module 2301 is further configured to: before the first terminal apparatus determines the first symbol set and the second symbol set that are in the slot, determine that the first symbol set includes a feature symbol. There may be one or two feature symbols located foremost in the slot in time domain.

Optionally, the processing module 2301 is further configured to determine, based on one or more of the following items, that the first symbol set includes the feature symbol: a quantity of slots consecutively occupied for transmitting the first data, numbers of a plurality of slots consecutively occupied by the first data, a subcarrier spacing to be used to transmit the first data, a size of the first data, bandwidth of a frequency domain resource for transmitting the first data, a quantity of symbols that can be used to send the first data, a modulation and coding scheme to be used to send the first data, or channel state information of a current resource or resource pool.

In a possible design, the sending module 2302 is further configured to send indication information to a second terminal apparatus. The indication information may be used to indicate one or more types of the following information: whether the slot includes the feature symbol, the quantity of symbols included in the first symbol set, whether the first symbol set exists, or whether the second symbol set exists.

For example, the feature symbol may include at least one of the following symbols: a symbol to be used to perform automatic gain control, a symbol used to determine to perform a scaling operation on the transmission block of the first data, a symbol used to determine to perform a rate matching operation on the transmission block of the first data, or a symbol used to determine to perform a puncturing operation on the transmission block of the first data.

It should be noted that, optionally, the communications apparatus 2300 shown in FIG. 23 may further include a receiving module 2303, so that the communications apparatus 2300 can also perform a function performed by the second terminal apparatus in the communication method shown in FIG. 14, to implement bidirectional communication.

It should be noted that the communications apparatus 2300 may be the terminal device, the RSU, or the network device shown in FIG. 2, or may be a chip or a chip system disposed in the terminal device, the RSU, or the network device. This is not limited in this embodiment of this application.

It is easy to understand that both the foregoing method embodiments and apparatus embodiments are described by using a first terminal apparatus side as an example. The second terminal apparatus may perform a function corresponding to the function of the first terminal apparatus. The communication method shown in FIG. 7 is used as an example. Corresponding to the first terminal apparatus, the second terminal apparatus may perform the following step: The second terminal apparatus receives, from the first terminal apparatus, the transmission block carrying the first data. Then, the second terminal apparatus determines a scaling factor based on a subcarrier spacing of a first time-frequency resource of the first data and/or a quantity of slots occupied by the first time-frequency resource. The first time-frequency resource occupies a single slot or a plurality of consecutive slots. The second terminal apparatus determines, based on the scaling factor, a size of the transmission block carrying the first data, and performs a decoding operation based on the size of the transmission block.

It should be noted that the second terminal apparatus may further perform another function that can be performed by the second terminal apparatus in the communication method shown in FIG. 7. For details, refer to related descriptions of the second terminal apparatus in the communication method shown in FIG. 7. Details are not described herein again.

Actually, in a bidirectional communication scenario, the first terminal apparatus may also perform a receiving function, and correspondingly, the second terminal apparatus may also perform a sending function.

It should be noted that the communications apparatus 2300 may be the terminal device, the RSU, or the network device shown in FIG. 2, or may be a chip or a chip system disposed in the terminal device, the RSU, or the network device. This is not limited in this embodiment of this application.

Figure 24:
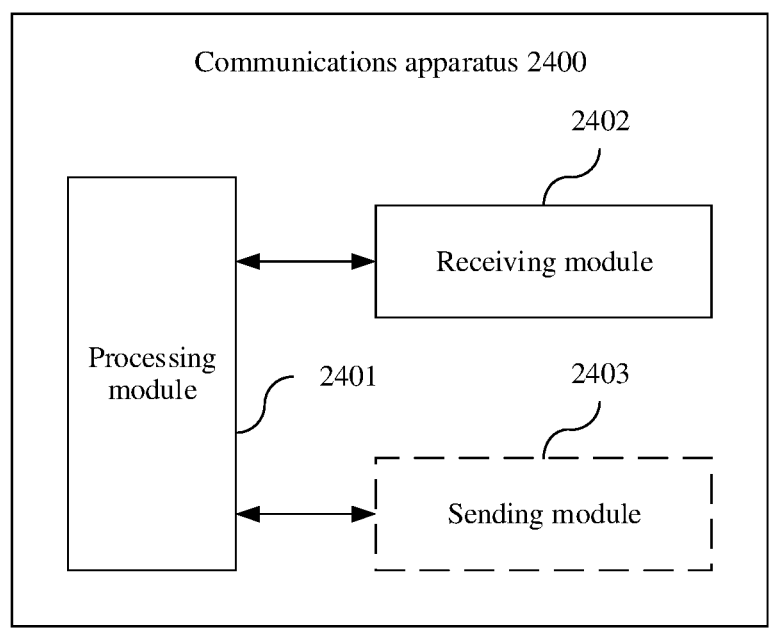
FIG. 24 is a fifth schematic structural diagram of a terminal apparatus according to an embodiment of this application.

FIG. 24 is a schematic structural diagram of still another communications apparatus according to an embodiment of this application. The communications apparatus may be applicable to the communications system shown in FIG. 2, and perform a function of the second terminal apparatus in the communication method shown in FIG. 7. For ease of description, FIG. 24 shows only main components of the communications apparatus.

As shown in FIG. 24, the communications apparatus 2400 includes a processing module 2401 and a receiving module 2402.

The receiving module 2402 is configured to receive, from a first terminal apparatus, a transmission block carrying first data. The processing module 2401 is configured to determine a scaling factor based on a subcarrier spacing of a first time-frequency resource of the first data and/or a quantity of slots occupied by the first time-frequency resource. The first time-frequency resource occupies a single slot or a plurality of consecutive slots. The processing module 2401 is further configured to determine, based on the scaling factor, a size of the transmission block carrying the first data, and perform a decoding operation based on the size of the transmission block.

It should be noted that the communications apparatus 2400 may further perform another function that can be performed by the second terminal apparatus in the communication method shown in FIG. 7. For details, refer to related descriptions of the second terminal apparatus in the communication method shown in FIG. 7. Details are not described herein again.

Actually, in a bidirectional communication scenario, the communications apparatus 2400 may also perform a sending function. In other words, as shown in FIG. 24, optionally, the communications apparatus 2400 may further include a sending module 2403. The sending module 2403 is configured to send signaling or data to the first terminal apparatus.

It should be noted that the communications apparatus 2400 may be the terminal device, the RSU, or the network device shown in FIG. 2, or may be a chip or a chip system disposed in the terminal device, the RSU, or the network device. This is not limited in this embodiment of this application.

An embodiment of this application provides a communications system. The communications system includes the foregoing first terminal apparatus and the foregoing second terminal apparatus.

An embodiment of this application provides a computer-readable storage medium. The computer-readable storage medium stores a computer instruction. When the computer instruction is run on a computer, the computer is enabled to perform the communication method shown in any one of FIG. 4, FIG. 7, or FIG. 14.

An embodiment of this application provides a computer program product including an instruction. The computer program product includes a computer program or instruction. When the computer program or instruction is run on a computer, the computer is enabled to perform the communication method shown in any one of FIG. 4, FIG. 7, or FIG. 14.

It should be understood that, the processor in the embodiments of this application may be a central processing unit (CPU), or may be another general-purpose processor, a digital signal processor (DSP), an application-specific integrated circuit (application specific integrated circuit, ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. As examples rather than limitative descriptions, random access memories (RAMs) in many forms may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented by using software, hardware (for example, circuit), firmware, or any combination thereof. When software is used to implement the embodiments, the foregoing embodiments may be implemented completely or partially in a form of a computer program product. The computer program product includes one or more computer instructions or computer programs. When the program instructions or the computer programs are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) form. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid state drive.

It should be understood that the term "and/or" in this specification describes only an association relationship for describing associated objects and represents that three relationships may exist. For example, A and/or B may represent the following three cases: only A exists, both A and B exist, and only B exists. A and B may be singular or plural. In addition, the character "/" in this specification usually represents an "or" relationship between the associated objects, or may represent an "and/or" relationship. A specific meaning depends on a context.

In this application, "at least one" means one or more, and "a plurality of" means two or more than two. "At least one of the following items (pieces)" or a similar expression thereof indicates any combination of these items, including a single item (piece) or any combination of a plurality of items (pieces). For example, at least one of a, b, or c may indicate: a, b, c, a and b, a and c, b and c, or a, b, and c, where a, b, and c may be singular or plural.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other ways. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   mapping, by a first terminal apparatus, first data to M symbols in a slot, wherein the M symbols are consecutive symbols in the slot, the first data is mapped to symbols that are from the $2^{nd}$ symbol in the M symbols to the last symbol in the M symbols, and resource elements in the $2^{nd}$ symbol in the M symbols to which the first data is mapped are duplicated in the $1^{st}$ symbol in the M symbols, and wherein the $1^{st}$ symbol in the M symbols is to be used to perform automatic gain control; and
   sending, by the first terminal apparatus, the first data on the M symbols to a second terminal apparatus.

2. The method according to claim 1, wherein the M symbols are consecutive symbols that are available for sending sidelink data in the slot.

3. The method according to claim 1, wherein the last symbol in the M symbols is before the last symbol in the slot.

4. The method according to claim 1, further comprising:
   performing, by the first terminal apparatus on the M symbols, rate matching on the first data.

5. The method according to claim 1, wherein the M symbols are symbols that are from symbol 0 to symbol 13 in the slot, from symbol 0 to symbol 12 in the slot, from symbol 5 to symbol 13 in the slot, from symbol 0 to symbol 8 in the slot, from symbol 7 to symbol 13 in the slot, from symbol 0 to symbol 6 in the slot, from symbol 0 to symbol 5 in the slot, or from symbol 7 to symbol 12 in the slot.

6. A communications apparatus, comprising:
   one or more processors, configured to:
      map first data to M symbols in a slot, wherein the M symbols are consecutive symbols in the slot, the first data is mapped to symbols that are from the $2^{nd}$ symbol in the M symbols to the last symbol in the M symbols, and resource elements in the $2^{nd}$ symbol in the M symbols to which the first data is mapped are duplicated in the $1^{st}$ symbol in the M symbols, and wherein the $1^{st}$ symbol in the M symbols is to be used to perform automatic gain control; and
      send the first data on the M symbols.

7. The apparatus according to claim 6, wherein the M symbols are consecutive symbols that are available for sending sidelink data in the slot.

8. The apparatus according to claim 6, wherein the last symbol in the M symbols is before the last symbol in the slot.

9. The apparatus according to claim 6, wherein the one or more processors are further configured to perform, on the M symbols, rate matching on the first data.

10. The apparatus according to claim 6, wherein the M symbols are symbols that are from symbol 0 to symbol 13 in the slot, from symbol 0 to symbol 12 in the slot, from symbol 5 to symbol 13 in the slot, from symbol 0 to symbol 8 in the slot, from symbol 7 to symbol 13 in the slot, from symbol 0 to symbol 6 in the slot, from symbol 0 to symbol 5 in the slot, or from symbol 7 to symbol 12 in the slot.

11. A communication method, comprising:
    receiving, by a second terminal apparatus, a first data in a slot, wherein the slot comprises M consecutive symbols, the first data is mapped to symbols that are from the $2^{nd}$ symbol in the M symbols to the last symbol in the M symbols, and resource elements in the $2^{nd}$ symbol in the M symbols to which the first data is mapped are duplicated in the $1^{st}$ symbol in the M symbols, and wherein the $1^{st}$ symbol in the M symbols is to be used to perform automatic gain control; and
    demodulating, by the second terminal apparatus, the first data.

12. The method according to claim 11, wherein the M symbols are consecutive symbols that are available for sending sidelink data in the slot.

13. The method according to claim 11, wherein the last symbol in the M symbols is before the last symbol in the slot.

14. The method according to claim 11, wherein the M symbols are symbols that are from symbol 0 to symbol 13 in the slot, from symbol 0 to symbol 12 in the slot, from symbol 5 to symbol 13 in the slot, from symbol 0 to symbol 8 in the slot, from symbol 7 to symbol 13 in the slot, from symbol 0 to symbol 6 in the slot, from symbol 0 to symbol 5 in the slot, or from symbol 7 to symbol 12 in the slot.

15. The apparatus according to claim 11, wherein the $1^{st}$ symbol in the M symbols is symbol 0, symbol 1, symbol 2, symbol 3, symbol 4, symbol 5, symbol 6, or symbol 7 in the slot.

16. A communications apparatus, comprising:
    one or more processors, configured to:
       receive a first data in a slot, wherein the slot comprises M consecutive symbols, the first data is mapped to symbols that are from the $2^{nd}$ symbol in the M symbols to the last symbol in the M symbols, and resource elements in the $2^{nd}$ symbol in the M symbols to which the first data is mapped are duplicated in the $1^{st}$ symbol in the M symbols, and wherein the $1^{st}$ symbol in the M symbols is to be used to perform automatic gain control; and
       demodulate the first data.

17. The apparatus according to claim 16, wherein the M symbols are consecutive symbols that are available for sending sidelink data in the slot.

18. The apparatus according to claim 16, wherein the last symbol in the M symbols is before the last symbol in the slot.

19. The apparatus according to claim 16, wherein the M symbols are symbols that are from symbol 0 to symbol 13 in the slot, from symbol 0 to symbol 12 in the slot, from symbol 5 to symbol 13 in the slot, from symbol 0 to symbol 8 in the slot, from symbol 7 to symbol 13 in the slot, from symbol 0 to symbol 6 in the slot, from symbol 0 to symbol 5 in the slot, or from symbol 7 to symbol 12 in the slot.

20. The apparatus according to claim 16, wherein the $1^{st}$ symbol in the M symbols is symbol 0, symbol 1, symbol 2, symbol 3, symbol 4, symbol 5, symbol 6, or symbol 7 in the slot.

* * * * *

UNITED STATES PATENT AND TRADEMARK OFFICE
CERTIFICATE OF CORRECTION

PATENT NO. : 12,058,671 B2
APPLICATION NO. : 17/487921
DATED : August 6, 2024
INVENTOR(S) : Li et al.

It is certified that error appears in the above-identified patent and that said Letters Patent is hereby corrected as shown below:

In the Claims

In Column 45, in Claim 5, Lines 33-37, delete "symbol o to symbol 13 in the slot, from symbol o to symbol 12 in the slot, from symbol 5 to symbol 13 in the slot, from symbol o to symbol 8 in the slot, from symbol 7 to symbol 13 in the slot, from symbol o to symbol 6 in the slot, from symbol o" and insert -- symbol 0 to symbol 13 in the slot, from symbol 0 to symbol 12 in the slot, from symbol 5 to symbol 13 in the slot, from symbol 0 to symbol 8 in the slot, from symbol 7 to symbol 13 in the slot, from symbol 0 to symbol 6 in the slot, from symbol 0 --.

In Column 45, in Claim 10, Lines 61-63, delete "symbol o to symbol 13 in the slot, from symbol o to symbol 12 in the slot, from symbol 5 to symbol 13 in the slot, from symbol o" and insert -- symbol 0 to symbol 13 in the slot, from symbol 0 to symbol 12 in the slot, from symbol 5 to symbol 13 in the slot, from symbol 0 --.

In Column 46, in Claim 10, Line 2, delete "symbol o to symbol 6 in the slot, from symbol o" and insert -- symbol 0 to symbol 6 in the slot, from symbol 0 --.

In Column 46, in Claim 14, Lines 24-28, delete "symbol o to symbol 13 in the slot, from symbol o to symbol 12 in the slot, from symbol 5 to symbol 13 in the slot, from symbol o to symbol 8 in the slot, from symbol 7 to symbol 13 in the slot, from symbol o to symbol 6 in the slot, from symbol o" and insert -- symbol 0 to symbol 13 in the slot, from symbol 0 to symbol 12 in the slot, from symbol 5 to symbol 13 in the slot, from symbol 0 to symbol 8 in the slot, from symbol 7 to symbol 13 in the slot, from symbol 0 to symbol 6 in the slot, from symbol 0 --.

In Column 46, in Claim 15, Line 31, delete "symbol o," and insert -- symbol 0, --.

In Column 46, in Claim 19, Lines 53-57, delete "symbol o to symbol 13 in the slot, from symbol o to symbol 12 in the slot, from symbol 5 to symbol 13 in the slot, from symbol o to symbol 8 in the slot, from symbol 7 to symbol 13 in the slot, from symbol o to symbol 6 in the slot, from symbol o" and Signed and Sealed this
Nineteenth Day of November, 2024

Katherine Kelly Vidal
*Director of the United States Patent and Trademark Office* insert -- symbol 0 to symbol 13 in the slot, from symbol 0 to symbol 12 in the slot, from symbol 5 to symbol 13 in the slot, from symbol 0 to symbol 8 in the slot, from symbol 7 to symbol 13 in the slot, from symbol 0 to symbol 6 in the slot, from symbol 0 --.

In Column 46, in Claim 20, Line 60, delete "symbol o," and insert -- symbol 0, --.